United States Patent [19]

Yoshimoto et al.

[11] Patent Number: 5,825,728
[45] Date of Patent: Oct. 20, 1998

[54] OPTICAL DISK AND OPTICAL DISK DRIVE DEVICE

[75] Inventors: Kyosuke Yoshimoto, Nagaokakyo; M. C. Rao, Kurashiki-shi; Hiroyuki Ohata, Nagaokakyo; Kazuhiko Nakane; Teruo Furukawa, both of Nagaokakyo; Junichi Kondo; Masafumi Ototake, both of Amagasaki, all of Japan

[73] Assignee: Mitsubishi Denki Kabushiki Kaisha, Tokyo, Japan

[21] Appl. No.: 914,782

[22] Filed: Aug. 20, 1997

Related U.S. Application Data

[62] Division of Ser. No. 718,263, Sep. 20, 1996, Pat. No. 5,717,683, which is a division of Ser. No. 128,193, Sep. 29, 1993, Pat. No. 5,592,452.

[30] Foreign Application Priority Data

| Oct. 5, 1992 | [JP] | Japan | 4-265893 |
| Oct. 12, 1992 | [JP] | Japan | 4-272673 |
| Dec. 4, 1992 | [JP] | Japan | 4-325319 |
| Sep. 24, 1993 | [JP] | Japan | 5-238354 |

[51] Int. Cl.$^6$ .................................................. G11B 7/00
[52] U.S. Cl. .................. 369/32; 369/58; 369/54; 369/275.3
[58] Field of Search .................. 369/32, 54, 58, 369/275.1, 275.3, 275.4

[56] References Cited

U.S. PATENT DOCUMENTS

| 4,797,752 | 1/1989 | Giddings | 369/54 |
| 4,811,124 | 3/1989 | Dujari et al. | 369/54 |
| 4,819,218 | 4/1989 | Barnard | 369/59 |
| 4,827,462 | 5/1989 | Flannagan et al. | 369/32 |
| 4,873,679 | 10/1989 | Murai et al. | 369/32 |
| 4,984,230 | 1/1991 | Satoh et al. | 369/54 |
| 5,040,110 | 8/1991 | Miki et al. | 369/111 |

(List continued on next page.)

OTHER PUBLICATIONS

J. E. Kulakowski, "Logical Track Format on Banded Media", Feb. 4, 1992, pp. 1–9, 20–22.
European Computer Manufacturers Association, "Data Interchange on 130 mm Optical Disk Cartridges 2 G Byte Cartridge", Oct. 28,1992, pp. 63–66.
ECMA Agenda for the 29th Meeting of TC 3I, 28th–30th Oct. 1992.
2nd Draft Proposed Standard ECMA, "Data Inter Change on 130mm Optical Disk Cartriges of the Read Only and Rewritable Type–Extended Capacity–", March 1992.
1st Draft Proposed Standard ECMA, "Information Technology—230MB Capacity 90mm Optical Disk Cartridges, Rewritable and Read Only, for Data Interchange", Jan. 1993.
3rd Draft Proposal Standard ECMA, "Information Interchange on Second Generation 130mm Optical Disk Cartridges, Rewritable and Worm, Using the Magneto Optic Effect, and Read Only", Sep. 1992.

(List continued on next page.)

*Primary Examiner*—Tod R. Swann
*Assistant Examiner*—Kim-Kwok Chu

[57] ABSTRACT

An optical disk physical has a recording region divided into zones, each zone including physical tracks adjacent to each other. An integer number of sectors are provided in each physical track. The angular recording density is higher in the more outward zones such that the linear recording density is substantially constant throughout the recording region, and logical tracks are formed of a predetermined number of sectors, independent of the physical tracks. The conversion between the logical track and sector addresses read from the disk and the linear logical addresses supplied from a host device is easy. The addresses written in headers of the sectors in the logical track in which data are actually recorded, including substitute sectors used in place of defect sectors, are preferably consecutive to further facilitate the conversion between the logical track and sector addresses read from the disk and the linear logical addresses supplied from the host device. Each of the zones can be set to serve as any of the different types of recording area, independently of other zones.

3 Claims, 27 Drawing Sheets

U.S. PATENT DOCUMENTS

| | | | |
|---|---|---|---|
| 5,138,599 | 8/1992 | Fukushima et al. | 369/54 |
| 5,173,886 | 12/1992 | Satoh et al. | 369/58 |
| 5,185,733 | 2/1993 | Finkelstein et al. | 369/58 |
| 5,202,799 | 4/1993 | Hetzler et al. | 360/48 |
| 5,214,627 | 5/1993 | Nakashima et al. | 369/32 |
| 5,233,576 | 8/1993 | Curtis et al. | 369/275.2 |
| 5,245,594 | 9/1993 | Shimizu | 369/54 |
| 5,247,494 | 9/1993 | Ohno et al. | 369/58 |
| 5,255,261 | 10/1993 | Iida et al. | 369/44.26 |
| 5,265,230 | 11/1993 | Saldanha et al. | 369/275.2 |
| 5,270,885 | 12/1993 | Satoh et al. | 360/77.04 |
| 5,278,815 | 1/1994 | Mashimo et al. | 369/48 |
| 5,305,302 | 4/1994 | Hardwick | 369/44.26 |
| 5,321,673 | 6/1994 | Okazaki | 369/275.2 |
| 5,418,773 | 5/1995 | Bakx et al. | 369/275.1 |
| 5,592,452 | 1/1997 | Yoshimoto et al. | 369/58 |
| 5,717,683 | 2/1998 | Yoshimoto et al. | 369/275.3 |

OTHER PUBLICATIONS

4th Draft Proposed Standard ECMA, "Data Interchange on 130 mm Optical Disk Cartridge 2 GBytes Per Cartridge Capacity", 1992.

Standard ECMA–154, "Data Interchange on 90mm Optical Disk Cartridge, Read Only and Rewritable, M.O.", Jun. 1991.

FIG.5

| ZN | S/R | PT/Z | S/Z | ΣS/Z | LT/G | ΔLT/G | S/G | ΣS/G | DΣS |
|---|---|---|---|---|---|---|---|---|---|
| 0 | 59 | 741 | 43719 | 43719 | 2572 | 47 | 43724 | 43724 | 5 |
| 1 | 58 | 740 | 42920 | 86639 | 2525 | 44 | 42925 | 86649 | 10 |
| 2 | 57 | 740 | 42180 | 128819 | 2481 | 43 | 42177 | 128826 | 7 |
| 3 | 56 | 740 | 41440 | 170259 | 2438 | 44 | 41446 | 170272 | 13 |
| 4 | 55 | 740 | 40700 | 210959 | 2394 | 43 | 40698 | 210970 | 11 |
| 5 | 54 | 740 | 39960 | 250919 | 2351 | 44 | 39967 | 250937 | 18 |
| 6 | 53 | 740 | 39220 | 290139 | 2307 | 43 | 39219 | 290156 | 17 |
| 7 | 52 | 740 | 38480 | 328619 | 2264 | 44 | 38488 | 328644 | 25 |
| 8 | 51 | 740 | 37740 | 366359 | 2220 | 44 | 37740 | 366384 | 25 |
| 9 | 50 | 740 | 37000 | 403359 | 2176 | 43 | 36992 | 403376 | 17 |
| 10 | 49 | 740 | 36260 | 439619 | 2133 | 44 | 36261 | 439637 | 18 |
| 11 | 48 | 740 | 35520 | 475139 | 2089 | 43 | 35513 | 475150 | 11 |
| 12 | 47 | 740 | 34780 | 509919 | 2046 | 44 | 34782 | 509932 | 13 |
| 13 | 46 | 740 | 34040 | 543959 | 2002 | 43 | 34034 | 543966 | 7 |
| 14 | 45 | 740 | 33300 | 577259 | 1959 | 44 | 33303 | 577269 | 10 |
| 15 | 44 | 740 | 32560 | 609819 | 1915 | 43 | 32555 | 609824 | 5 |
| 16 | 43 | 740 | 31820 | 641639 | 1872 | 44 | 31824 | 641648 | 9 |
| 17 | 42 | 740 | 31080 | 672719 | 1828 | 43 | 31076 | 672724 | 5 |
| 18 | 41 | 740 | 30340 | 703059 | 1785 | 44 | 30345 | 703069 | 10 |
| 19 | 40 | 740 | 29600 | 732659 | 1741 | 43 | 29597 | 732666 | 7 |
| 20 | 39 | 740 | 28860 | 761519 | 1698 | 44 | 28866 | 761532 | 13 |
| 21 | 38 | 740 | 28120 | 789639 | 1654 | 43 | 28118 | 789650 | 11 |
| 22 | 37 | 740 | 27380 | 817019 | 1611 | 44 | 27387 | 817037 | 18 |
| 23 | 36 | 740 | 26640 | 843659 | 1567 | 43 | 26639 | 843676 | 17 |
| 24 | 35 | 740 | 25900 | 869559 | 1524 | 44 | 25908 | 869584 | 25 |
| 25 | 34 | 740 | 25160 | 894719 | 1480 | 44 | 25160 | 894744 | 25 |
| 26 | 33 | 740 | 24420 | 919139 | 1436 | 43 | 24412 | 919156 | 17 |
| 27 | 32 | 740 | 23680 | 942819 | 1393 | 44 | 23681 | 942837 | 18 |
| 28 | 31 | 740 | 22940 | 965759 | 1349 | 43 | 22933 | 965770 | 11 |
| 29 | 30 | 740 | 22200 | 987959 | 1386 | 42 | 22202 | 987972 | 13 |
| 30 | 29 | 741 | 21489 | 1009448 | 1264 | | 21488 | 1009460 | 12 |

FIG.7

| ZN | S/R | PT/Z | S/Z | ΣS/Z | G+T | LT/G | S/G | ΔLT/G | ΣS/G |
|---|---|---|---|---|---|---|---|---|---|
| 0 | 59 | 740 | 43660 | 43660 | 177 | 2549 | 43333 | 43 | 43333 |
| 1 | 58 | 740 | 42920 | 86580 | 174 | 2506 | 42602 | 43 | 85935 |
| 2 | 57 | 740 | 42180 | 128760 | 171 | 2463 | 41871 | 43 | 127806 |
| 3 | 56 | 740 | 41440 | 170200 | 168 | 2420 | 41140 | 43 | 168946 |
| 4 | 55 | 740 | 40700 | 210900 | 165 | 2377 | 40409 | 43 | 209355 |
| 5 | 54 | 740 | 39960 | 250860 | 162 | 2334 | 39678 | 43 | 249033 |
| 6 | 53 | 740 | 39220 | 290080 | 159 | 2291 | 38947 | 43 | 287980 |
| 7 | 52 | 740 | 38480 | 328560 | 156 | 2248 | 38216 | 43 | 326196 |
| 8 | 51 | 740 | 37740 | 366300 | 153 | 2205 | 37485 | 43 | 363681 |
| 9 | 50 | 740 | 37000 | 403300 | 150 | 2162 | 36754 | 43 | 400435 |
| 10 | 49 | 740 | 36260 | 439560 | 147 | 2119 | 36023 | 43 | 436458 |
| 11 | 48 | 740 | 35520 | 475080 | 144 | 2076 | 35292 | 43 | 471750 |
| 12 | 47 | 740 | 34780 | 509860 | 141 | 2033 | 34561 | 43 | 506311 |
| 13 | 46 | 740 | 34040 | 543900 | 138 | 1990 | 33830 | 43 | 540141 |
| 14 | 45 | 740 | 33300 | 577200 | 135 | 1947 | 33099 | 43 | 573240 |
| 15 | 44 | 740 | 32560 | 609760 | 132 | 1904 | 32368 | 43 | 605608 |
| 16 | 43 | 740 | 31820 | 641580 | 129 | 1861 | 31637 | 43 | 637245 |
| 17 | 42 | 740 | 31080 | 672660 | 126 | 1818 | 30906 | 43 | 668151 |
| 18 | 41 | 740 | 30340 | 703000 | 123 | 1775 | 30175 | 43 | 698326 |
| 19 | 40 | 740 | 29600 | 732600 | 120 | 1732 | 29444 | 43 | 727770 |
| 20 | 39 | 740 | 28860 | 761450 | 117 | 1689 | 28713 | 43 | 756483 |
| 21 | 38 | 740 | 28120 | 789580 | 114 | 1646 | 27982 | 43 | 784465 |
| 22 | 37 | 740 | 27380 | 815960 | 111 | 1603 | 27251 | 43 | 811716 |
| 23 | 36 | 740 | 26640 | 843600 | 108 | 1560 | 26520 | 43 | 838236 |
| 24 | 35 | 740 | 25900 | 869500 | 105 | 1517 | 25789 | 43 | 864025 |
| 25 | 34 | 740 | 25160 | 894660 | 102 | 1474 | 25058 | 43 | 889083 |
| 26 | 33 | 740 | 24420 | 919080 | 99 | 1431 | 24327 | 43 | 913410 |
| 27 | 32 | 740 | 23680 | 942760 | 96 | 1388 | 23596 | 43 | 937006 |
| 28 | 31 | 740 | 22940 | 965700 | 93 | 1345 | 22865 | 43 | 959871 |
| 29 | 30 | 740 | 22200 | 987900 | 90 | 1302 | 22134 | 43 | 982005 |
| 30 | 29 | 740 | 21460 | 1009360 | 87 | 1259 | 21403 |  | 1003408 |

FIG.8

| ZN | S/R | PT/Z | S/Z | RES | G+T | DUM | ΔDUM | LT/G | ΔLT/G | S/G |
|---|---|---|---|---|---|---|---|---|---|---|
| 0 | 59 | 740 | 43660 | 361 | 177 | 184 |  | 2547 | 43 | 43299 |
| 1 | 58 | 740 | 42920 | 352 | 174 | 178 | 6 | 2504 | 43 | 42568 |
| 2 | 57 | 740 | 42180 | 343 | 171 | 172 | 6 | 2461 | 43 | 41837 |
| 3 | 56 | 740 | 41440 | 334 | 168 | 166 | 6 | 2418 | 43 | 41106 |
| 4 | 55 | 740 | 40700 | 325 | 165 | 160 | 6 | 2375 | 43 | 40375 |
| 5 | 54 | 740 | 39960 | 316 | 162 | 154 | 6 | 2332 | 43 | 39644 |
| 6 | 53 | 740 | 39220 | 307 | 159 | 148 | 6 | 2289 | 43 | 38913 |
| 7 | 52 | 740 | 38480 | 298 | 156 | 142 | 6 | 2245 | 43 | 38182 |
| 8 | 51 | 740 | 37740 | 289 | 153 | 136 | 6 | 2203 | 43 | 37451 |
| 9 | 50 | 740 | 37000 | 280 | 150 | 130 | 6 | 2160 | 43 | 36720 |
| 10 | 49 | 740 | 36260 | 271 | 147 | 124 | 6 | 2117 | 43 | 35989 |
| 11 | 48 | 740 | 35520 | 262 | 144 | 118 | 6 | 2074 | 43 | 35258 |
| 12 | 47 | 740 | 34780 | 253 | 141 | 112 | 6 | 2031 | 43 | 34527 |
| 13 | 46 | 740 | 34040 | 244 | 138 | 106 | 6 | 1988 | 43 | 33796 |
| 14 | 45 | 740 | 33300 | 235 | 135 | 100 | 6 | 1945 | 43 | 33065 |
| 15 | 44 | 740 | 32560 | 226 | 132 | 94 | 6 | 1902 | 43 | 32334 |
| 16 | 43 | 740 | 31820 | 217 | 129 | 88 | 6 | 1859 | 43 | 31603 |
| 17 | 42 | 740 | 31080 | 208 | 126 | 82 | 6 | 1816 | 43 | 30872 |
| 18 | 41 | 740 | 30340 | 199 | 123 | 76 | 6 | 1773 | 43 | 30141 |
| 19 | 40 | 740 | 29600 | 190 | 120 | 70 | 6 | 1730 | 43 | 29410 |
| 20 | 39 | 740 | 28860 | 181 | 117 | 64 | 6 | 1687 | 43 | 28679 |
| 21 | 38 | 740 | 28120 | 172 | 114 | 58 | 6 | 1644 | 43 | 27948 |
| 22 | 37 | 740 | 27380 | 163 | 111 | 52 | 6 | 1601 | 43 | 27217 |
| 23 | 36 | 740 | 26640 | 154 | 108 | 46 | 6 | 1558 | 43 | 26486 |
| 24 | 35 | 740 | 25900 | 145 | 105 | 40 | 6 | 1515 | 43 | 25755 |
| 25 | 34 | 740 | 25160 | 136 | 102 | 34 | 6 | 1472 | 43 | 25024 |
| 26 | 33 | 740 | 24420 | 127 | 99 | 28 | 6 | 1429 | 43 | 24293 |
| 27 | 32 | 740 | 23680 | 118 | 96 | 22 | 6 | 1386 | 43 | 23562 |
| 28 | 31 | 740 | 22940 | 109 | 93 | 16 | 6 | 1343 | 43 | 22831 |
| 29 | 30 | 740 | 22200 | 100 | 90 | 10 | 6 | 1300 | 43 | 22100 |

FIG.9

| ZN | LT/G | PT/Z | S/R |
|---|---|---|---|
| 0 | 5,104 | 1496 | 58 |
| 1 | 4,928 | 1496 | 56 |
| 2 | 4,752 | 1496 | 54 |
| 3 | 4,576 | 1496 | 52 |
| 4 | 4,400 | 1496 | 50 |
| 5 | 4,224 | 1496 | 48 |
| 6 | 4,048 | 1496 | 46 |
| 7 | 3,872 | 1496 | 44 |
| 8 | 3,696 | 1496 | 42 |
| 9 | 3,520 | 1496 | 40 |
| 10 | 3,344 | 1496 | 38 |
| 11 | 3,168 | 1496 | 36 |
| 12 | 2,992 | 1496 | 34 |
| 13 | 2,816 | 1496 | 32 |
| 14 | 2,640 | 1496 | 30 |

FIG.10

| ZN | LT/G | PT/Z | S/R |
|---|---|---|---|
| 0 | 2,862 | 837 | 106 |
| 1 | 2,808 | 837 | 104 |
| 2 | 2,754 | 837 | 102 |
| 3 | 2,700 | 837 | 100 |
| 4 | 2,646 | 837 | 98 |
| 5 | 2,592 | 837 | 96 |
| 6 | 2,538 | 837 | 94 |
| 7 | 2,484 | 837 | 92 |
| 8 | 2,430 | 837 | 90 |
| 9 | 2,376 | 837 | 88 |
| 10 | 2,322 | 837 | 86 |
| 11 | 2,268 | 837 | 84 |
| 12 | 2,214 | 837 | 82 |
| 13 | 2,160 | 837 | 80 |
| 14 | 2,106 | 837 | 78 |
| 15 | 2,052 | 837 | 76 |
| 16 | 1,998 | 837 | 74 |
| 17 | 1,944 | 837 | 72 |
| 18 | 1,890 | 837 | 70 |
| 19 | 1,836 | 837 | 68 |
| 20 | 1,782 | 837 | 66 |
| 21 | 1,728 | 837 | 64 |
| 22 | 1,674 | 837 | 62 |
| 23 | 1,620 | 837 | 60 |
| 24 | 1,566 | 837 | 58 |
| 25 | 1,512 | 837 | 56 |
| 26 | 1,458 | 837 | 54 |

FIG.12

| ZN | S/R | PT/Z | S/Z | S/LT | LT/G | S/G |
|---|---|---|---|---|---|---|
| 0 | 59 | 752 | 44368 | 16 | 2773 | 44368 |
| 1 | 58 | 752 | 43616 | 16 | 2726 | 43616 |
| 2 | 57 | 752 | 42864 | 16 | 2679 | 42864 |
| 3 | 56 | 752 | 42112 | 16 | 2632 | 42112 |
| 4 | 55 | 752 | 41360 | 16 | 2585 | 41360 |
| 5 | 54 | 752 | 40608 | 16 | 2538 | 40608 |
| 6 | 53 | 752 | 39856 | 16 | 2491 | 39856 |
| 7 | 52 | 752 | 39104 | 16 | 2444 | 39104 |
| 8 | 51 | 752 | 38352 | 16 | 2397 | 38352 |
| 9 | 50 | 752 | 37600 | 16 | 2350 | 37600 |
| 10 | 49 | 752 | 36848 | 16 | 2303 | 36848 |
| 11 | 48 | 752 | 36096 | 16 | 2256 | 36096 |
| 12 | 47 | 752 | 35344 | 16 | 2209 | 35344 |
| 13 | 46 | 752 | 34592 | 16 | 2162 | 34592 |
| 14 | 45 | 752 | 33840 | 16 | 2115 | 33840 |
| 15 | 44 | 752 | 33088 | 16 | 2068 | 33088 |
| 16 | 43 | 752 | 32336 | 16 | 2021 | 32336 |
| 17 | 42 | 752 | 31584 | 16 | 1974 | 31584 |
| 18 | 41 | 752 | 30832 | 16 | 1927 | 30832 |
| 19 | 40 | 752 | 30080 | 16 | 1880 | 30080 |
| 20 | 39 | 752 | 29328 | 16 | 1833 | 29328 |
| 21 | 38 | 752 | 28576 | 16 | 1786 | 28576 |
| 22 | 37 | 752 | 27824 | 16 | 1739 | 27824 |
| 23 | 36 | 752 | 27072 | 16 | 1692 | 27072 |
| 24 | 35 | 752 | 26320 | 16 | 1645 | 26320 |
| 25 | 34 | 752 | 25568 | 16 | 1598 | 25568 |
| 26 | 33 | 752 | 24816 | 16 | 1551 | 24816 |
| 27 | 32 | 752 | 24064 | 16 | 1504 | 24064 |
| 28 | 31 | 752 | 23312 | 16 | 1457 | 23312 |
| 29 | 30 | 752 | 22560 | 16 | 1410 | 22560 |

FIG.13

| ZN | S/R | PT/Z | S/Z | S/LT | LT/G | S/G |
|---|---|---|---|---|---|---|
| 0 | 59 | 768 | 45312 | 128 | 354 | 45312 |
| 1 | 58 | 768 | 44544 | 128 | 348 | 44544 |
| 2 | 57 | 768 | 43776 | 128 | 342 | 43776 |
| 3 | 56 | 768 | 43008 | 128 | 336 | 43008 |
| 4 | 55 | 768 | 42240 | 128 | 330 | 42240 |
| 5 | 54 | 768 | 41472 | 128 | 324 | 41472 |
| 6 | 53 | 768 | 40704 | 128 | 318 | 40704 |
| 7 | 52 | 768 | 39936 | 128 | 312 | 39936 |
| 8 | 51 | 768 | 39168 | 128 | 306 | 39168 |
| 9 | 50 | 768 | 38400 | 128 | 300 | 38400 |
| 10 | 49 | 768 | 37632 | 128 | 294 | 37632 |
| 11 | 48 | 768 | 36864 | 128 | 288 | 36864 |
| 12 | 47 | 768 | 36096 | 128 | 282 | 36096 |
| 13 | 46 | 768 | 35328 | 128 | 276 | 35328 |
| 14 | 45 | 768 | 34560 | 128 | 270 | 34560 |
| 15 | 44 | 768 | 33792 | 128 | 264 | 33792 |
| 16 | 43 | 768 | 33024 | 128 | 258 | 33024 |
| 17 | 42 | 768 | 32256 | 128 | 252 | 32256 |
| 18 | 41 | 768 | 31488 | 128 | 246 | 31488 |
| 19 | 40 | 768 | 30720 | 128 | 240 | 30720 |
| 20 | 39 | 768 | 29952 | 128 | 234 | 29952 |
| 21 | 38 | 768 | 29184 | 128 | 228 | 29184 |
| 22 | 37 | 768 | 28416 | 128 | 222 | 28416 |
| 23 | 36 | 768 | 27648 | 128 | 216 | 27648 |
| 24 | 35 | 768 | 26880 | 128 | 210 | 26880 |
| 25 | 34 | 768 | 26112 | 128 | 204 | 26112 |
| 26 | 33 | 768 | 25344 | 128 | 198 | 25344 |
| 27 | 32 | 768 | 24576 | 128 | 192 | 24576 |
| 28 | 31 | 768 | 23808 | 128 | 186 | 23808 |
| 29 | 30 | 768 | 23040 | 128 | 180 | 23040 |

FIG.19

| ZN | PT/Z | S/R | LT/G | FLT | LT | TEST | DUM | PAR |
|---|---|---|---|---|---|---|---|---|
| 0 | 748 | 59 | 2596 | 00000 | 00004-02583 | 02588-02591 | 5 | 144 |
| 1 | 748 | 58 | 2552 | 02596 | 02600-05135 | 05140-05143 | 5 | 142 |
| 2 | 748 | 57 | 2508 | 05148 | 05128-07643 | 07648-07651 | 5 | 140 |
| 3 | 748 | 56 | 2464 | 07656 | 07660-10107 | 10112-10115 | 5 | 138 |
| 4 | 748 | 55 | 2420 | 10120 | 10124-12527 | 12532-12535 | 5 | 136 |
| 5 | 748 | 54 | 2376 | 12540 | 12544-14903 | 14908-14911 | 5 | 134 |
| 6 | 748 | 53 | 2332 | 14916 | 14920-17235 | 17240-17243 | 5 | 132 |
| 7 | 748 | 52 | 2288 | 17248 | 17252-19523 | 19528-19531 | 5 | 130 |
| 8 | 748 | 51 | 2244 | 19536 | 19540-21767 | 21772-21775 | 5 | 128 |
| 9 | 748 | 50 | 2200 | 21780 | 21784-23967 | 23972-23975 | 5 | 126 |
| 10 | 748 | 49 | 2156 | 23980 | 23984-26123 | 26128-26131 | 5 | 124 |
| 11 | 748 | 48 | 2112 | 26136 | 26140-28235 | 28240-28243 | 5 | 122 |
| 12 | 748 | 47 | 2068 | 28248 | 28252-30303 | 30308-30311 | 5 | 120 |
| 13 | 748 | 46 | 2024 | 30316 | 30320-32327 | 32332-32335 | 5 | 118 |
| 14 | 748 | 45 | 1980 | 32340 | 32344-34307 | 34312-34315 | 5 | 116 |
| 15 | 748 | 44 | 1936 | 34320 | 34324-36243 | 36248-36241 | 5 | 114 |
| 16 | 748 | 43 | 1892 | 36256 | 36260-38135 | 38140-38143 | 5 | 112 |
| 17 | 748 | 42 | 1848 | 38148 | 38152-39983 | 39988-39991 | 5 | 110 |
| 18 | 748 | 41 | 1804 | 39996 | 40000-41787 | 41792-41795 | 5 | 108 |
| 19 | 748 | 40 | 1760 | 41800 | 41804-43547 | 43552-43555 | 5 | 106 |
| 20 | 748 | 39 | 1716 | 43560 | 43564-45263 | 45268-45271 | 5 | 104 |
| 21 | 748 | 38 | 1672 | 45276 | 45280-46935 | 46940-46943 | 5 | 102 |
| 22 | 748 | 37 | 1628 | 46948 | 46952-48563 | 48568-48571 | 5 | 100 |
| 23 | 748 | 36 | 1584 | 48576 | 48580-50147 | 50152-50155 | 5 | 98 |
| 24 | 748 | 35 | 1540 | 50160 | 50164-51687 | 51692-51695 | 5 | 96 |
| 25 | 748 | 34 | 1496 | 51700 | 51704-53183 | 53188-53191 | 5 | 94 |
| 26 | 748 | 33 | 1452 | 53196 | 53200-54635 | 54640-54643 | 5 | 92 |
| 27 | 748 | 32 | 1408 | 54648 | 54652-56043 | 56048-56051 | 5 | 90 |
| 28 | 748 | 31 | 1364 | 56056 | 56060-57407 | 57412-57415 | 5 | 88 |
| 29 | 748 | 30 | 1320 | 57420 | 57424-58727 | 58736-58739 | 5 | 86 |

FIG.20

| BYTE No. | CONTENT | SETTING | | | | | | | |
|---|---|---|---|---|---|---|---|---|---|
| | | R/W | WO | O-ROM | R/W+O-ROM | R/W+WO | WO+O-ROM | R/W+WO+O-ROM |
| 22 | TYPE OF ZONE 0 | (01) | (03) | (02) | (01)/(01) | (01)/(03) | (03)/(02) | (01)/(03)/(02) |
| 23 | TYPE OF ZONE 1 | (01) | (03) | (02) | (01)/(02) | (01)/(03) | (03)/(02) | (01)/(03)/(02) |
| ...... | ...... | ...... | ...... | ...... | ...... | ...... | ...... | ...... |
| 50 | TYPE OF ZONE 28 | (01) | (03) | (02) | (01)/(02) | (01)/(03) | (03)/(02) | (01)/(03)/(02) |
| 51 | TYPE OF ZONE 29 | (01) | (03) | (02) | (01)/(02) | (01)/(03) | (03)/(02) | (01)/(03)/(02) |

OPTICAL DISK AND OPTICAL DISK DRIVE DEVICE

This application is a divisional of application Ser. No. 08/718,263, filed on Sep. 20, 1996, now U.S. Pat. No. 5,717,683 issued on Feb. 10, 1998 which was a divisonal of Ser. No. 08/128,193, filed Sep. 29, 1993, now U.S. Pat. No. 5,592,452 the issues on Jan. 7, 1997 the entire contents of which are hereby incorporated by reference.

BACKGROUND OF THE INVENTION

The present invention relates to an optical disk permitting reading and writing of data while being rotated at a constant angular velocity, and more particularly to an optical disk having a recording surface divided into a plurality of zones, with clocks of higher frequencies being used for the access to the more outward zones so that the recording linear density is substantially identical between the outer and inner zones.

The present invention also relates to an optical disk which contains different types of recording media for the respective zones, and in which the types of the respective zones can be altered during use of the disk.

The present invention also relates to an optical disk drive device used for writing in and reading from the above-mentioned optical disks.

Known optical disks of the type having a storage capacity of 1 GB on each surface have a format proposed in ECMA/TC31/92/36. According to this proposal, the recording surface of the optical disk is divided into a plurality of zones equally, i.e., such that the numbers of the physical tracks in the respective zones are substantially equal. The number of zones depends on the size of the sector. If each sector consists of 512 bytes, the number of the zones is 54. If each sector consists of 1024 bytes, the number of the zones is 30.

Each physical track has an integer number of sectors. The number of sectors in each track is constant throughout each zone. The number of sectors in each track is larger in more outward zones.

The optical disks that are available are either those of the R/W (read/write or rewritable) type which permit writing and rewriting as desired, and those of the WO (write-once) type which permit writing only once after fabrication, and those of O-ROM (embossed) type in which data is written at the time of fabrication, by embossing, and which do not permit writing after fabrication.

The number of sectors in each physical track differs from one zone to another, as described above. A complex algorithm is needed for indexing the physical location of the target sector when for instance the optical disk is used as a SCSI device, and is supplied with linear (consecutive-integer-numbered) logical addresses. Moreover, the data field in each sector in an innermost physical track of a certain zone and the header field in each sector in an outermost physical track of another zone next to and inside of the first-mentioned zone may be adjacent to each other, with the result that the crosstalk from the header field may degrade the quality of the data read from the data field. This is because the information in the header field is written in the form of pit (embossment) and has a greater degree of modulation, causing a greater crosstalk, while the information in the data field is magneto-optically written and has a smaller degree of modulation. In this connection, it is noted that within each zone, header fields in all the tracks are radially aligned and data fields in all the tracks are radially aligned, so that a header field and a data field will not be adjacent to each other.

It is also desired that recording areas of the R/W type, of the WO type and of the O-ROM type be co-existing in a single disk to expand the application of the disks. In the past, optical disks of the P-ROM type, in which the recording areas of the R/W type and the recording areas of the O-ROM type are coexisting, were available. But, no other combination of recording areas have been known.

SUMMARY OF THE INVENTION

An object of the invention is to provide an optical disk which enables quick indexing of the physical location of the target sector responsive to a given address.

Another object of the invention is to provide an optical disk permitting mixed presence of recording areas of different types.

A further object of the invention is to provide an optical disk drive device used for such optical disks.

According to a first aspect of the invention, there is provided an optical disk comprising a recording region, physical tracks in said recording region each corresponding to one revolution, said recording region being divided into a plurality of zones by one or more circular boundary lines centered on the center of the disk, each zone comprising a plurality of physical tracks adjacent to each other, wherein an integer number of sectors are provided in each physical track, the angular recording density is higher in the more outward zones such that the linear recording density is substantially constant throughout the recording region, and logical tracks are formed of a predetermined number of sectors, independent of the physical tracks.

With the above arrangement, each logical track is formed of sectors, independent of the physical tracks, and the number of the sectors in each logical track is constant throughout the recording region, regardless of the radial position of the sector within the recording region, so that the conversion between the logical track and sector addresses read from the disk, at the sectors being accessed by the read/write head, and the linear logical addresses (one-dimensional addresses, or addresses represented by consecutive integers) supplied from a host device is easy, and the grouping and defect management are easy.

The addresses written in headers of the sectors in the logical track in which data are actually recorded, including substitute sectors used in place of defect sectors, are preferably consecutive to further facilitate the conversion between the logical track and sector addresses read from the disk and the linear logical addresses supplied from the host device.

The difference obtained by subtracting the number of the logical tracks corresponding to each zone from the number of the logical tracks corresponding to another zone adjacent to and radially outside of said each zone is preferably constant.

With this arrangement, the address management of the disk is facilitated, and the number of the logical tracks in the zone in question can be determined through simple calculation on integers, without referring to a table for address conversion, and the determination of the target sector during seek operation can be made with ease.

The number of the physical tracks of zones adjacent to each other are preferably made equal by providing sectors in which data is not recorded.

With this arrangement, the calculation for determining the number of tracks to be traversed for accessing the target track is easy, and the management of the physical location is easy.

Addresses of the sectors in the tracks in which data is not recorded may be assigned independently of the addresses of the sectors in the tracks in which data is recorded. Similarly, addresses of the sectors in the test track in each zone are assigned independently of the addresses of the sectors in the tracks in which data is recorded. With this arrangement, management of the tracks in which data is not recorded and the test tracks is facilitated. The logical track and sector addresses are of consecutive values, so that the address management of the recorded data is facilitated. Access management of the test tracks is also facilitated.

The difference obtained by subtracting the number of sectors in each zone in which data is not recorded from the number of sectors in another zone adjacent to and outside of said each zone and in which data is not recorded is preferably constant.

With this arrangement, the number of the sectors in each zone in which data is not recorded can be determined through simple calculation on integers, without referring to a table, and the address management of the disk is easy.

Data may not be recorded in the outermost and innermost physical tracks in each zone. This arrangement avoids crosstalk at the boundary between zones. That is, the header fields are not necessarily aligned radially between different zones, and the header fields and the data fields of tracks adjacent to each other and belonging to different zones may be adjacent to each other. However, by the above arrangement in which the outermost and innermost physical tracks are not used for recording data, the tracks in which data is recorded is separated from the tracks of a different zone, by at least one track in the same zone and in which data is not recorded, so that the crosstalk is substantially eliminated. Degradation in the quality of data or disorder in tracking can therefore by prevented, and the more reliable data recording is achieved.

At least one of said physical data in each zone may be a test track used for adjustment of recording power. With this arrangement, the recording power can be adjusted for each zone, and the reliability of the recording can be further improved.

Defect management may be effected for each zone. With this arrangement, even where a defective track is found, it can be substituted for by a track within the same zone, and it is not necessary to switch the clock frequency while accessing the substitute track. As a result, address management for controlling the hardware depending on the actual physical location (where the read/write head is accessing), e.g., for switching the clock frequency, and defect management can be achieved in common, so that the address management is achieved with a high speed.

Each logical track may be composed of $2^n$ sectors, with n being an integer. With this arrangement, the addresses of the sectors are represented by consecutive integers, i.e., they are one-dimensional, so that the calculation of the addresses of the sectors is easy.

An address of each sector may be written $2^m$ times, and an ID may be added to the address at each occurrence to indicate the order of the occurrence. With this arrangement, the addresses each formed of the track address, the sector address and the ID, are linear, or are represented by consecutive integers. Accordingly, the formatter used for formatting such a disk can be formed of a counter. Moreover, the sector addresses can be determined by counting up $2^m$ times. The configuration of the formatter is therefore simple.

An address for each sector may comprise a track address and a sector address, or a track address, a sector address and an ID, which are arranged in the stated order from the side of the MSB. The linear address is incremented by one with increase of the sector number. The formatter is therefore formed of a simple up-counter.

A predetermined number of bits from the head of the address for each sector represents a virtual logical track. Since the virtual track address is always the predetermined number of bits, the compatibility with the convention optical disk drive devices is improved. For instance, according to the conventional optical disk standard, the PEP region (phase encoding part where the physical properties of the disk or the conditions under which the writing is to be performed are written) has a region for track addresses of only 16 bits. To be compatible with such a standard, 16 bits from the MSB are taken as the virtual track address.

It may be so arranged that an attribute, which is either an attribute indicating a rewritable area, a write-once area or a read-only area, can be independently set for each zone. It is then possible to place different types of areas in a single disk, in various combinations, and disk which best suits to the intended applications can be obtained.

A difference obtained by subtracting the number of parity tracks of each zone from the number of parity tracks of another zone adjacent to and outside of said each zone is preferably constant. Then, it is possible to determine the number of the parity tracks in each zone without referring to a table.

Where a rewritable area and a write-once area are both provided in a single disk, it is preferable that a rewritable area is provide outside of a write-once area. This improves the overall performance of the disk. This is because the rewritable area is more frequency accessed than the write-once area, and the data transfer is rate is higher in the more outward zones.

According to another aspect of the invention, there is provided an optical disk drive device for use in combination with an optical disk comprising a recording region, physical tracks in said recording region each corresponding to one revolution, said recording region being divided into a plurality of zones by one or more circular boundary lines centered on the center of the disk, each zone comprising a plurality of tracks adjacent to each other, wherein an integer number of sectors are provided in each physical track, the angular recording density is higher in the more outward zones such that the linear recording density is substantially constant throughout the recording region, and logical tracks are formed of a predetermined number of sectors, independent of the physical tracks, said optical disk drive device determining the logical track address and the sector address responsive to a linear logical address by determining the integral quotient and the remainder by dividing the linear logical by the number of the sectors per logical track.

With the above arrangement, conversion from the linear logical address supplied from the host device into the logical track and sector addresses can be achieved through simple calculation on integers and without referring to a table, so that the configuration of the drive device or the software for implementing the conversion may be simple.

According to another aspect of the invention, there is provided an optical disk drive device for use in combination with an optical disk comprising a recording region, physical tracks in said recording region each corresponding to one revolution, said recording region being divided into a plurality of zones by one or more circular boundary lines centered on the center of the disk, each zone comprising a plurality of tracks adjacent to each other, wherein an integer number of sectors are provided in each physical track, the angular recording density is higher in the more outward zones such that the linear recording density is substantially constant throughout the recording region, and logical tracks are formed of a predetermined number of sectors, independent of the physical tracks, wherein a difference obtained by subtracting the number of the logical tracks corresponding to each zone from the number of the logical tracks corresponding another zone adjacent to and radially outside of said each zone is of a constant value, said optical disk drive device determining the zone containing the target sector on the basis of a product of said constant value and the number of the zones.

With the above arrangement, the zone can be determined through simple calculation on integers and without referring to a table, so that the configuration of the device or the software for implementing the determination of the zone may be simple.

According to another aspect of the invention, there is provided an optical disk drive device for use in combination with an optical disk comprising a recording region, physical tracks in said recording region each corresponding to one revolution, said recording region being divided into a plurality of zones by one more circular boundary lines centered on the center of the disk, each zone comprising a plurality of tracks adjacent to each other, wherein an integer number of sectors are provided in each physical track, the angular recording density is higher in the more outward zones such that the linear recording density is substantially constant throughout the recording region, and logical tracks are formed of a predetermined number of sectors, independent of the physical tracks, said optical disk further comprising a table for recording attributes of the respective zones, said attributes indicating whether each zone is designated as a rewritable area, a write-once area or a read-only area, said table being formed in at least one track or in at least one sector, said optical disk device comprising a means for altering the attributes of the respective zones.

With the above arrangement, it is possible to alter the rewritable area to a write-once area. Such function is desired where the disk or part of the disk is used for storing data that should not be altered without specific permission. It is also possible to alter write-once area to a rewritable area.

According to another aspect of the invention, there is provided an optical disk drive device for use in combination with an optical disk comprising a recording region, physical tracks in said recording region each corresponding to one revolution, said recording region being divided into a plurality of zones by one or more circular boundary lines centered on the center of the disk, each zone comprising a plurality of tracks adjacent to each other, wherein an integer number of sectors are provided in each physical track, the angular recording density is higher in the more outward zones such that the linear recording density is substantially constant throughout the recording region, and logical tracks are formed of a predetermined number of sectors, independent of the physical tracks, said optical disk comprising a first part of the recording region designated as a rewritable area and a second part of the recording region designated as a write-once area, said optical disk device comprising a means for permitting access of only said rewritable area to a host device, and means for altering an attribute of said second part from the write-once area to the rewritable area and copying the data in said first part to said second part while said host device is not accessing the optical disk.

With the above arrangement, the host device needs only to provided a single command, e.g., a back-up command.

Then, the drive device executes the back-up command by copying the data from one part of the disk to another. In the execution of the command, the attributes of the zones may be altered before and after copying the data. Moreover, the back-up is achieved within a single disk, so that it is not necessary to back-up the data using another disk.

The optical disk drive device may further comprise means for copying the data in the second part to said first part while said host device is not accessing the optical disk. The host device needs only to provide a single command, e.g., a restore command. Then, the drive device executes the restore command by copying back the data from a write once area to a rewritable area.

The optical disk may have recording regions on first and second surfaces opposite to each other. In such a case, it may be desired if the rewritable area is formed on one of the surfaces and the write-once area is formed on the other surface. Then, even when the data on one of the surfaces is destroyed, identical data can be read from the other surface.

BRIEF DESCRIPTION OF THE DRAWINGS

FIG. 5 is a table showing the format of the disk of Embodiment 1.

FIG. 7 is a table showing the format of the disk of Embodiment 2.

FIG. 8 is a table showing the format of the disk of Embodiment 3.

FIG. 9 is a table showing an example of the format of Embodiment 3.

FIG. 10 is a table showing another example the format of the disk of Embodiment 4.

FIG. 12 is a table showing the format of the disk of Embodiment 5.

FIG. 13 is a table showing the format of the disk of Embodiment 6.

FIG. 19 is a table showing the format of the disk of Embodiment 9.

FIG. 20 is a table showing part of the disk structure management table.

DETAILED DESCRIPTION OF THE PREFERRED EMBODIMENTS

EMBODIMENT 1

Figure 1:
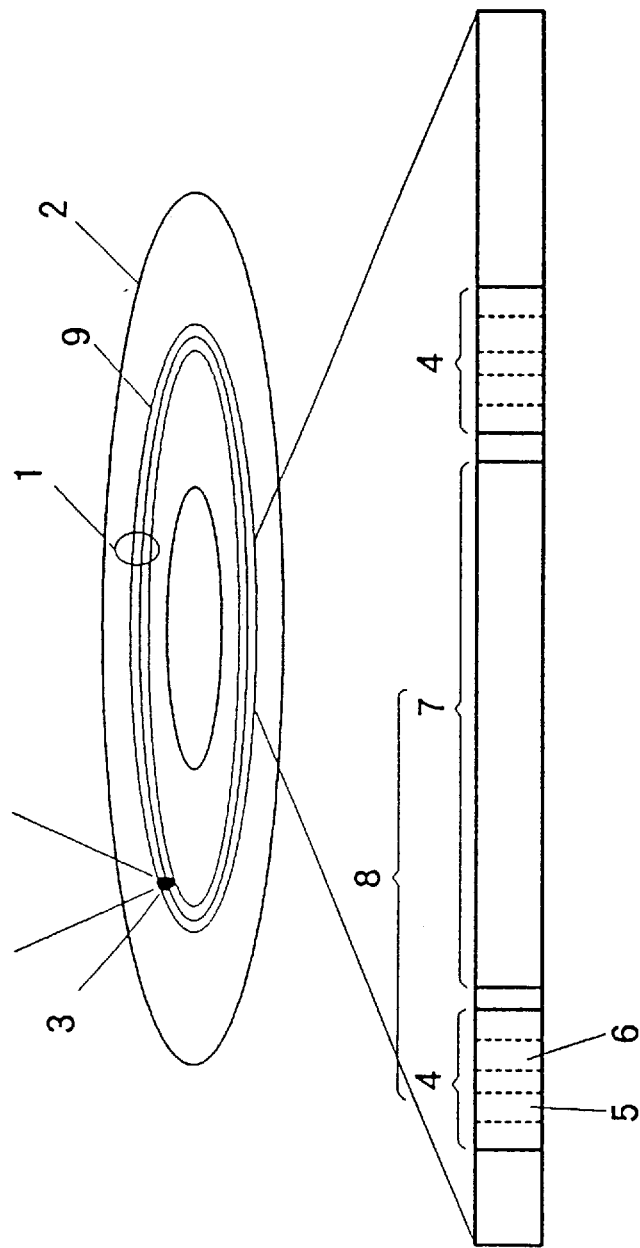
FIG. 1 is a perspective view showing the structure of an optical disk according to the invention.
Figure 2:
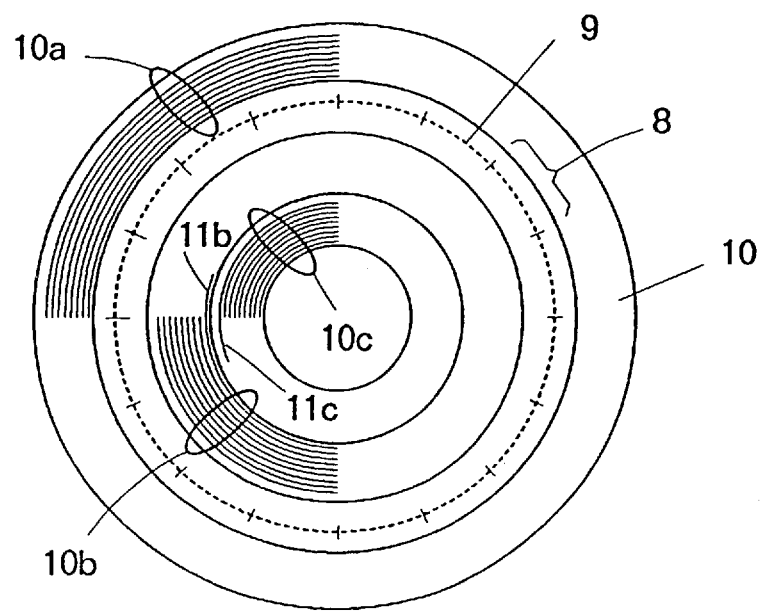
FIG. 2 is a plan view showing the structure of the optical disk of FIG. 1.
Figure 3:
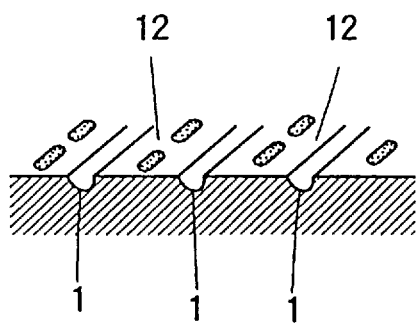
FIG. 3 is a perspective view showing, partially in section, guide grooves and land parts.
Figure 4:
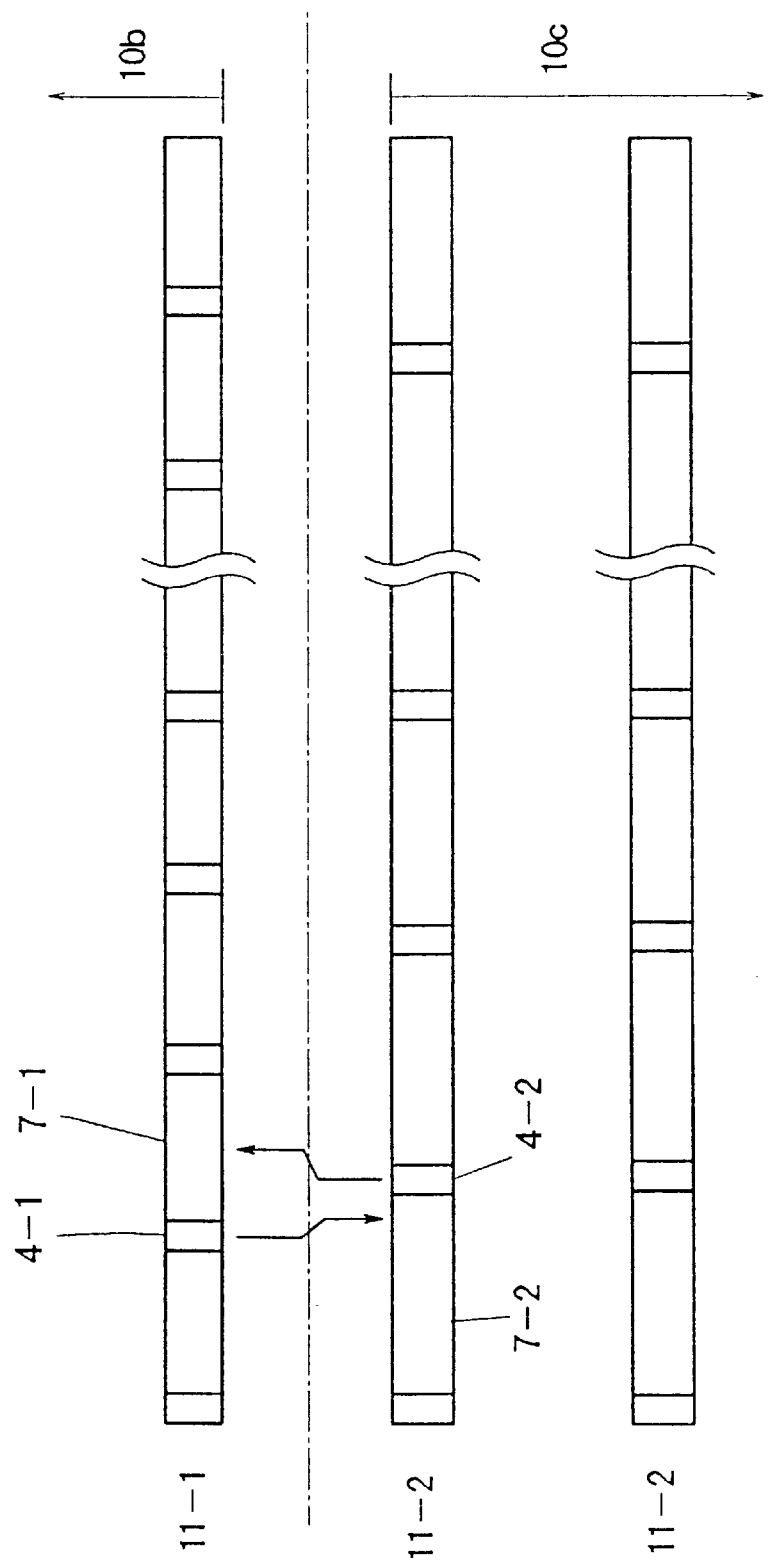
FIG. 4 is a diagram showing the tracks near the boundary of zones.

A first embodiment, Embodiment 1, will now be described with reference to FIGS. 1 to 5. FIGS. 1 and 2 show the structure of an optical disk of Embodiment 1. A spiral guide groove is formed on an optical disk 2. A light spot 3 is formed by focusing a light beam from a light source, not shown, onto a land part 12 between adjacent parts of the guide groove. Each header field 4 comprises a sector address field 5 and a track address field 6. The header fields 4 are in the form of pits in the land parts 12 formed by embossment or stamping when the disk is fabricated. That is, the header fields 4 are performatted. The data fields 7 are written magneto-optically. The information in the form of pits in the header fields 4 and the information magneto-optically recorded in the data fields 7 are read by means of the same light beam. Each sector 8 comprises a header field 4 and a data field 7.

Each of the physical tracks 9 corresponds to one revolution of the optical disk 2. Each physical track 9 is composed of an integer number of sectors. A plurality of physical tracks adjacent to each other form a zone 10a, 10b or 10c. That is, the recording region (user zone) within the recording surface of the optical disk 2 is divided into a plurality of zones by concentric boundary circular lines centered on the center of the disk. Each of the physical tracks in the recording region belongs to one of the zones. In the illustrated example, the recording region is divided into 31 zones (from zone No. 0 to zone No. 30). The outermost zone No. 0 and the innermost zone No. 30 each comprise 741 physical tracks, while other zones each comprise 740 physical tracks. The outermost zone No. 0 has the greatest number of sectors, and the more inward zones have a smaller number of sectors. The difference of the number of sectors between the adjacent zones is at least "one", and is "one" in the illustrated example.

In use, the disk is rotated at a constant angular velocity regardless of which of the zones the read/write head is accessing.

The frequency of the clocks used for recording data in the respective zone is varied or switched so that it is higher in the more outward zones, so that the linear recording density is substantially constant throughout the recording region (user zone) of the disk.

During reading, the frequency of the clocks is also switched when the read/write head is moved from one zone to another zone.

The innermost tracks 11b and the outermost track 11c in the zones 10b and 10c have their header field 4-1 and data field 7-2 adjacent to each other, and have their header fields 4-2 and data field 7-1 adjacent to each other.

The logical track structure shown in FIG. 5 is arranged in the physical structure described above. FIG. 5 shows an example in which each sector consists of 1024 bytes. Each logical track is composed of 17 sectors. The marks at the top parts of the respective columns in the table of FIG. 5 have the following meanings:

ZN: zone number
S/R: the number of sectors per revolution (physical track)
PT/Z: the number of physical tracks in the zone
S/Z: the number of sectors in the zone=S/R×PT/Z
Σ S/Z: the sum of the numbers of the sectors of the zones (from the first zone to the zone in question)
LT/G: the number of logical tracks in the revolution group
Δ LT/G: the difference in the number of logical tracks (LT/G) between the revolution group and the revolution group adjacent to and inside of the first-mentioned revolution group
S/G: the number of sectors in the revolution group
Σ S/G: the sum of the numbers of sectors in the revolution groups (from the first revolution group to the revolution group in question)
DΣ S: the difference between the sum of the numbers of the sectors of the zones and the sum of the numbers of sectors of the revolution groups=Σ S/G−Σ S/Z Each revolution group comprises a plurality of sectors. Each revolution group corresponds to each zone. The numbers of logical tracks of the respective revolution groups are determined such that the sectors belonging to the respective revolution groups are substantially equal to the number of the sectors in the corresponding zone. As a result, the starting point and the end point of each revolution group do not necessarily coincide with the starting point and the end point of the corresponding zone, and there may be some offset between them. The deferences (DΣ S) in the rightmost column in FIG. 5 indicate such offsets, that is, the numbers of sectors which are not in the corresponding zone, but in the next zone. The sectors (12 sectors in the illustrated example) which belong to the last revolution zone, but are not accommodated in the last zone are formed in a spare region, formed inside of the innermost zone.

The disk with the logical tracks formed as described above, the track address and the sector address written in the header field of each sector corresponds to the linear logical address supplied from a host device. The term "linear" with respect to the address means that the addresses are represented by values which are consecutive integers. Accordingly, the sector address and the track address are determined through simple calculation on integers. Although the number of sectors per revolution differs from one zone to another, this need not be taken account in the above calculation.

Moreover, the physical location of the sector on the disk can be determined from the logical track address and the sector address through simple calculation.

EMBODIMENT 2

Figure 6:
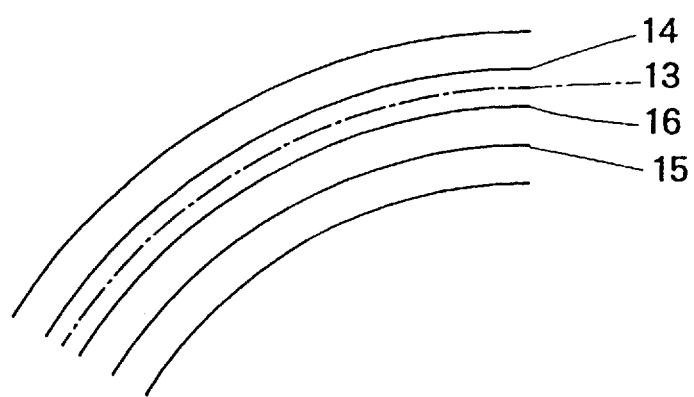
FIG. 6 is a partial plan view showing the placement of the guard and test tracks.

Another embodiment, Embodiment 2, will next be described with reference to FIGS. 6 and 7. FIG. 6 illustrates a part of the optical disk of Embodiment 2, and FIG. 7 is a table showing a physical track structure of the optical disk of Embodiment 2. As illustrated in FIG. 6, in the vicinity of the boundary of adjacent zones, at least one physical track 14, 15 of each of the adjacent zones are designated as guard tracks, which the user cannot use for recording data. In addition, at least one physical track 16 in each zone is designated as a test track, which the user cannot use for recording data. In the illustrated example, the innermost physical track in each zone is designated as a guard track 14, an outermost physical track is designated as the test track 16, and the physical track next to the outermost guard track 16 is designated as another guard track 15.

The guard tracks 14 and 15 are for avoiding crosstalk near the boundary between the adjacent zones. The guard tracks are assigned addresses independent of the addresses of the data recording sectors, and the addresses of the guard tracks are beyond the range of the addresses assigned to the sectors for recording data. This will ensure that the guard tracks are not accessed during recording or reading data, and the guard tracks are therefore not used for recording data.

The test track 16 is used for adjustment of the recording power. For instance, when the drive device is turned on, test data is recorded on the test track, with a given recording power, and is then reproduced, and the error occurrence rate is determined. The recording power is then varied in accordance with the determined error rate, and the recording is again made with the varied recording power. The above process is repeated until the error rate becomes sufficiently low. The recording power is thereby optimized.

Designating the physical track between the guard tracks 14 and 15 in the vicinity of each boundary between zones as the test track 16 is advantageous because, with such an arrangement, even when an excessive power is used for recording in the test track this does not affect the tracks used for recording.

However, any other track may alternatively be designated as the test track, as mentioned above.

The test tracks 16 are assigned addresses independent of the addresses of the data recording sectors, and the addresses of the test track are beyond the range of the addresses assigned to the sectors for recording data. This will ensure that the guard tracks are not accessed during recording or reading data, and the guard tracks are therefore not used for recording data.

The tracks other than the guard tracks and the test track are used for recording data, and each logical track is formed of 17 sectors. The numbers of the logical tracks in the respective revolution groups are determined so that the difference in the number of the logical tracks between the adjacent revolution groups is a constant value, which in the illustrated example is "43". With such an arrangement, the number of the logical tracks can be determined through simple calculation on integers, and management using a table or the like is unnecessary.

FIG. 7 shows the logical track structure of Embodiment 2. It is similar to that of FIG. 5. However, the number of the physical tracks in each of the zones No. 0 and No. 30 is 740, which is the same as the number of logical tracks in each of the other zones.

In FIG. 7, the marks which are at the top parts of the respective columns and which are identical to those in FIG. 5 have the same meanings as those in FIG. 5. "G+T" in FIG. 7 denote the number of sectors in the guard tracks and the test tract in the zone.

Embodiment 2 has an advantage over Embodiment 1 with regard to the following points: First, in Embodiment 1, the end point of the last logical track in each revolution group does not coincide with the end point of the zone, and some sectors are in the next zone, and the number of such sectors in the next zone is not constant. In such a case, the switching of the clocks must be controlled in the logical track. It is therefore necessary to perform management over substitution (for accessing the spare sectors in place of defect sectors), and the management over control related to the actual physical arrangement (e.g., the switching of the clocks). Secondly, crosstalks between adjacent tracks may occur near the zone boundaries. Thirdly, adjustment of power using a test track cannot be made. Furthermore, there is no rule or regularity on the number of logical tracks in the respective revolution groups, so that it is necessary to provide a table storing the number of logical tracks in each revolution group, and this table needs to be referred to for the conversion from the logical address to the physical address.

The logical track structure shown in FIG. 7 solves the problem discussed above. The logical tracks of each revolution are all accommodated in the corresponding zone. Moreover, by the provision of the guard tracks, the crosstalks at the zone boundary is eliminated. Furthermore, the recording power can be adjusted using the test track. In addition, since the difference in the number of logical tracks between adjacent revolution groups is constant, conversion from the logical address to the physical address can be achieved by simple calculation, and does not require a table.

Embodiment 3

Another embodiment, Embodiment 3, will next be described with reference to FIG. 8. It is similar to Embodiment 2, but differs from it in the following respects:

With the format of the logical track of Embodiment 2, the number of sectors remaining in each revolution group after assigning the required number of tracks for data recording differs from one tract to another. As a result, it is necessary to record the number of the remaining sectors in a table and refer to it in determining the physical location.

FIG. 8 shows the logical track structure for solving the above problem. The marks which are at the top parts of the respective columns and which are identical to those in FIG. 5 or 7 have the same meanings as those in FIG. 5 or 7. "DUM" denotes the number of sectors remaining after assigning the logical tracks, "Δ DUM" denotes the difference in DUM between adjacent zones, and "RES" denotes the sum of DUM and G+T.

As seen from FIG. 8, the difference in the number of the logical tracks, LT/G, between adjacent revolution groups is of a constant number, e.g., 43, and the three physical tracks are reserved for the guard tracks and the test track, and the number of the remaining sectors, DUM, is of a constant number, e.g., "6" in the illustrates example. Accordingly, the physical location of the sector can be determined through calculation using a formula in which the number of the remaining sectors, DUM, is incorporated, and it is not necessary to provide a table storing the number of remaining sectors of the respective revolution groups, which were necessary when the number of the remaining sectors differ from one revolution group to another.

Embodiment 4

Another embodiment, Embodiment 4, will next be described with reference to FIGS. 9 and 10. This embodiment is identical to Embodiment 2, except that the number of the physical tracks per revolution group and the number of the revolution groups within the recording region of the disk differ from those of Embodiment 2.

The format of the logical tracks of Embodiment 3 solved the problems of Embodiments 1 and 2, and the number of the remaining sectors is a positive number, so that the logical tracks do not bridge adjacent zones. Moreover, the physical location of a target sector can be determined through calculation on integers, without referring to a table. However, the remaining sectors in which no data is recorded exist. The capacity of the disk is not fully utilized.

FIGS. 9 and 10 shows logical track structures for solving the above problems of Embodiment 3 FIG. 9 shows a case in which each sector consists of 1024 bytes, while FIG. 10 shows a case in which each sector consists of 512 bytes. In each of FIG. 9 and 10, the total number of sectors in each revolution group corresponds to an integer number of logical tracks, and the difference in the number of logical tracks between adjacent revolution groups is a constant number, which is "176" in FIG. 9, or "54" in FIG. 10.

In the illustrated examples, no guard and test tracks are provided. However, they may be provided in the same way as in Embodiment 3.

Embodiment 5

Another embodiment, Embodiment 5, will next be described with reference to FIGS. 11 and 12. In this embodiment, each sector consists of 1024 bytes. The structure of the disk is identical to that shown in FIGS. 1 to 3, but the header field of each sector differs from that of FIG. 1. That is, as shown in FIG. 1, it has two header sections 4a and 4b. Each of the header sections 4a and 4b comprises a track address field 6, a sector address field 5 and an ID field 21. Identical addresses are recorded in the track address fields 6 and the sector address fields 5 in the two header sections 4a and 4b. The addresses indicate the sector of which the header sections 4a and 4b form a part. The identical addresses are written in duplicate in order to improve the reliability. A binary "0" is written in the ID field 21 in the first header section 4a, and a binary "1" is written in the ID field 21 in the second header section 4b. The ID field 21 in each header section 4a or 4b thereby identifies the header section, i.e., whether it is the first header section or the second header section in each sector.

FIG. 12 shows the logical track structure. The marks which are at the top pats of the respective columns and which are identical to those in FIGS. 5, 7 or 8 have the same meanings as those in FIGS. 5, 7 and 8. "S/LT" denotes the number of sectors per logical track. The arrangement of the tracks as shown is generally identical to that of FIG. 5 but differs from that of FIG. 5 in the following respects: First, the number of zones is not 31 as in FIG. 5, but is 30. Each zone has 752 physical tracks. Each logical track has $2^n$ sectors. In the illustrated example n=4 so that $2^n=2^4=16$ sectors.

Figure 11:
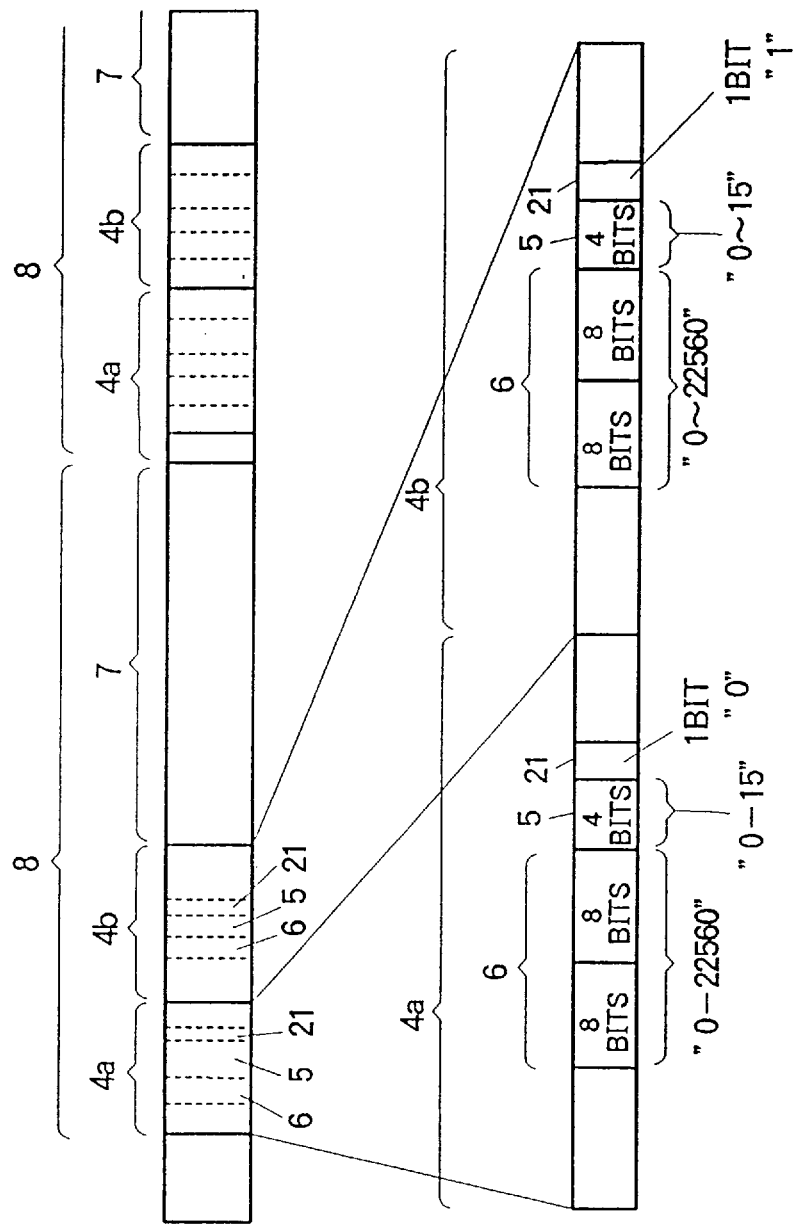
FIG. 11 is a diagram showing the format of the header field in Embodiment 5.

As illustrated in FIG. 11, the track address field 6 is formed of 16 bits, and is used to represent an address value of from "0" to "22560", and the sector address field 5 is formed of 4 bits and is used to represent an address value of from "0" to "15".

As has been described, since the track address is represented by $2^n$ or 16 bits, calculation of the track address is easy.

Embodiment 6

Figure 14:
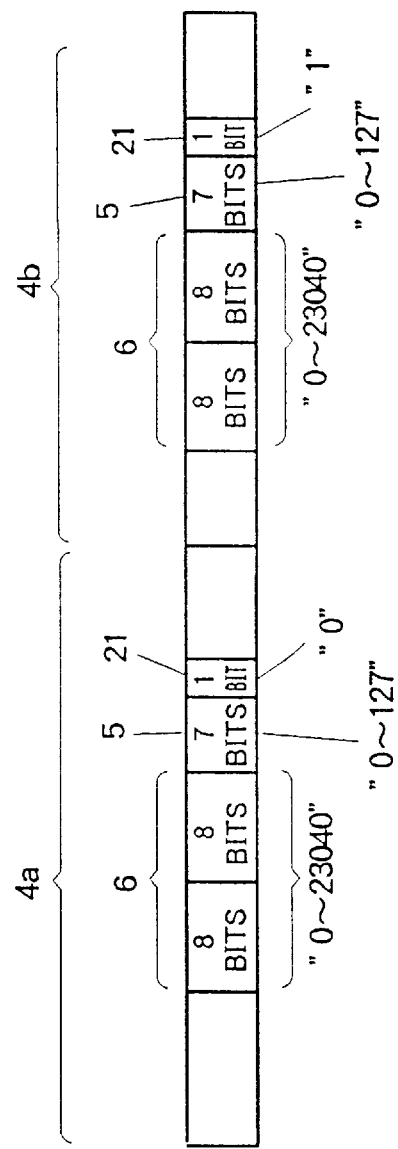
FIG. 14 is a diagram showing the format of the header field in Embodiment 6.

Another embodiment, Embodiment 6, will next be described with reference to FIGS. 13 and 14. Each sector consists of 1024 bytes, like Embodiment 5. As illustrated in FIG. 13, each of the zones Nos. 0 to 29 comprises 768 physical tracks 10, and each logical track consists of 128 sectors. Addresses are written in duplicate. FIG. 14 shows header sections 4a and 4b. The track address 6 is composed of 16 bits and is used to represent a value of from "0" to "23040". The sector address 5 is composed of 7 bits and is used to represent a value of from "0" to "127". The ID field is composed of a single bit and is used to represent "0" or "1".

With the arrangement of the logical tracks described above, the track address and sector address read from the disk correspond directly (as is) to the linear logical address from a host device, and the actual track and sector addresses can be determined through simple calculation on integers. Moreover, any difference in the number of sectors per revolution need not be taken account of.

Embodiment 7

Figure 15:
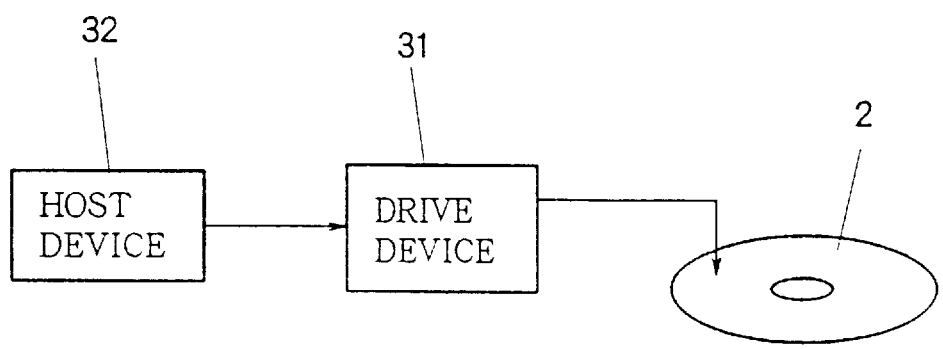
FIG. 15 is a diagram showing the optical disk drive device and the host device.

Another embodiment, Embodiment 7, will next be described with reference to FIGS. 15 and 16. This embodiment relates to an optical disk drive device, and in particular to its operation for addressing the target sector on an optical disk having been loaded onto the drive device. FIG. 15 shows an optical disk drive device 31 used for writing in and reading from optical disks, and a host device 32 connected to the optical disk drive device 31. The optical disk 2 is actually loaded in the optical disk device 31 but is shown to be placed outside the device 31 for the sake of convenience of illustration. The host device 32 provides commands for writing on or reading from the optical disk 2, together with the designation of the address on or from which the writing or reading is to be conducted. The address is a linear address.

Upon receipt of such a command, the drive device 31 performs the operation for seeking the track in which the sector corresponding to the designated address is located. The operation for writing and reading is known, and its description is omitted.

Figure 16:
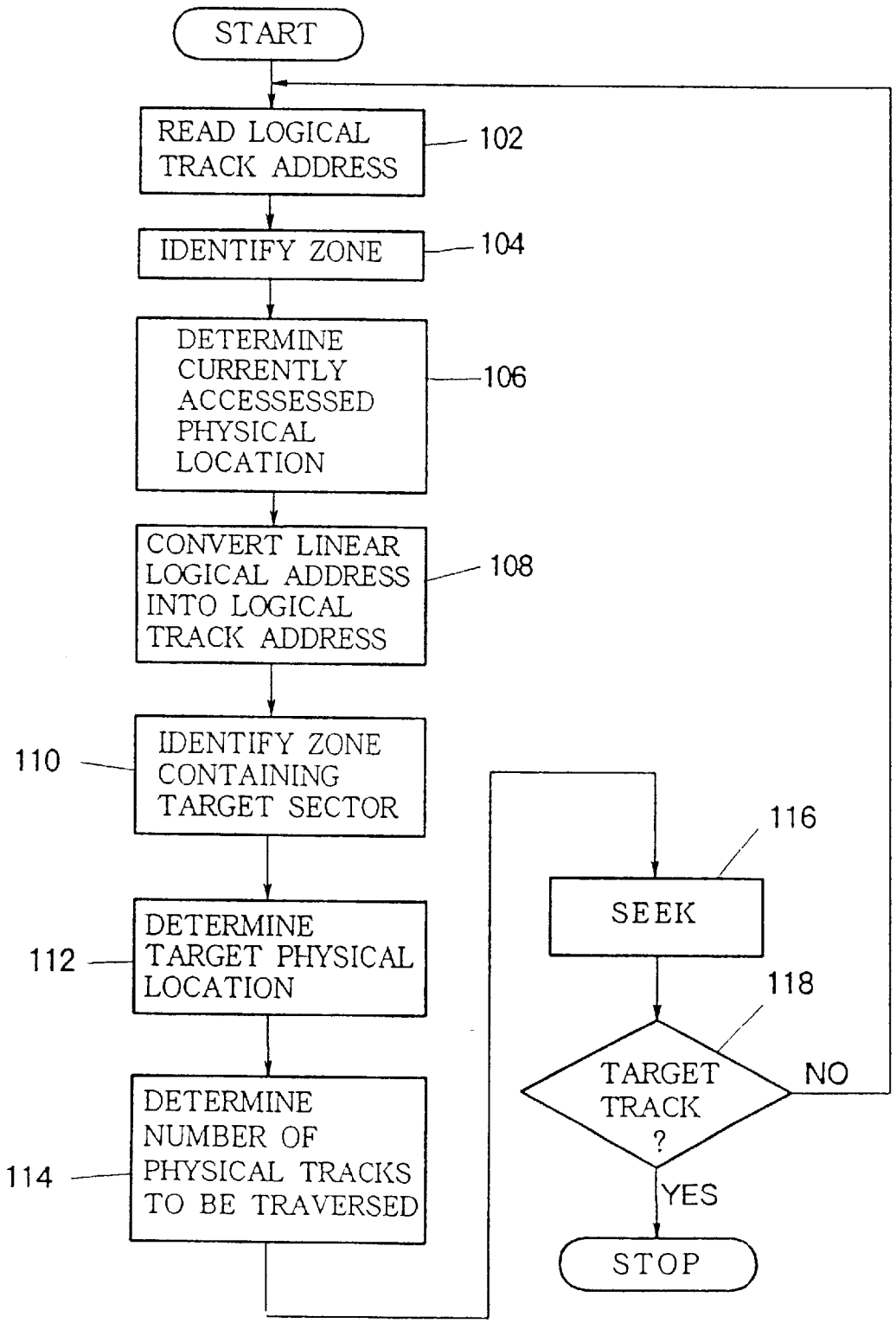
FIG. 16 is a flow chart showing the procedure of the operation of the drive device during access of a target sector in the optical disk.

FIG. 16 shows the seek operation. The drive device 31 first reads the logical track address of the currently-accessed track, i.e., the logical track which the read/write head of the optical disk drive device is now confronting or accessing (102). Then, on the basis of the track number having been read, the zone to which the currently-accessed logical track belongs, is identified, that is the zone number is determined (104). Then, the physical location of the logical track of which the address has been read is determined (106). Then, the linear logical address from the host device 32 is converted into the logical track address (108). Then, the zone number of the zone to which the target logical track belongs is determined (110). Then, the physical location of the target sector is determined (112). Then, the number of physical tracks which lie between and the currently-accessed track and the target position, i.e., which have to be traversed for the seek operation, is determined, taking into consideration the zone number (114). Then, the head is moved for traversing the number of physical tracks, that is determined to lie between the currently-accessed track and the target position (116). The above operation is repeated until the target track is reached (118).

When the head arrives at the target track, the addresses in the respective sectors are read, to find out the target sector.

Using the optical disks of the above embodiments exhibit advantages in the above-described seek operation. For instance, if a disk of any of Embodiments 1, 2 and 3 is used, the conversation at the step 108 is accomplished by simple calculation: That is, the logical track address At and the logical sector address As are given as the integral quotient and the remainder of the division:

$$A_L/(S/LT)$$

wherein S/LT is the number of sectors per logical track, and $A_L$ is the linear logical address from the host device. Accordingly, the table for the conversion of the address is not necessary and the configuration of the drive device and/or the software for implementing the seek operation is simplified.

An additional advantage obtained if a disk of Embodiment 2 is used is that the determination of the zone number at the step 104 and at the step 110 is made using the following relationship:

$$ZN \times \{LT/G_{ZN=0} + (LT/G_{ZN=0} - \Delta LT/G \times ZN)\}/2 = 17 \times At +$$

(the number of remaining sectors as stored in the table)

where $LT/G_{ZN=0}$ is the number of the logical tracks in the zone No. 0. The table needs only to store the number of the remaining sectors, which are relatively small figures. Therefore, the required size of the table is small, and the configuration of the device or the software for implementing the seek operation is simplified.

An additional advantage obtained if a disk of Embodiment 3 is used is that the determination of the zone number at the step 104 and at the step 110 is made using the following relationship:

$$ZN \times \{LT/G_{ZN=0} + (LT/G_{ZN=0} - \Delta LT/G \times ZN)\}/2 = 17 \times At$$

Thus, the correction using the number of remaining sectors as stored in the table is not requires. It is therefore not necessary to provide such a table for the determination of the zone number at the step 104 or 110.

Embodiment 8

Figure 17:
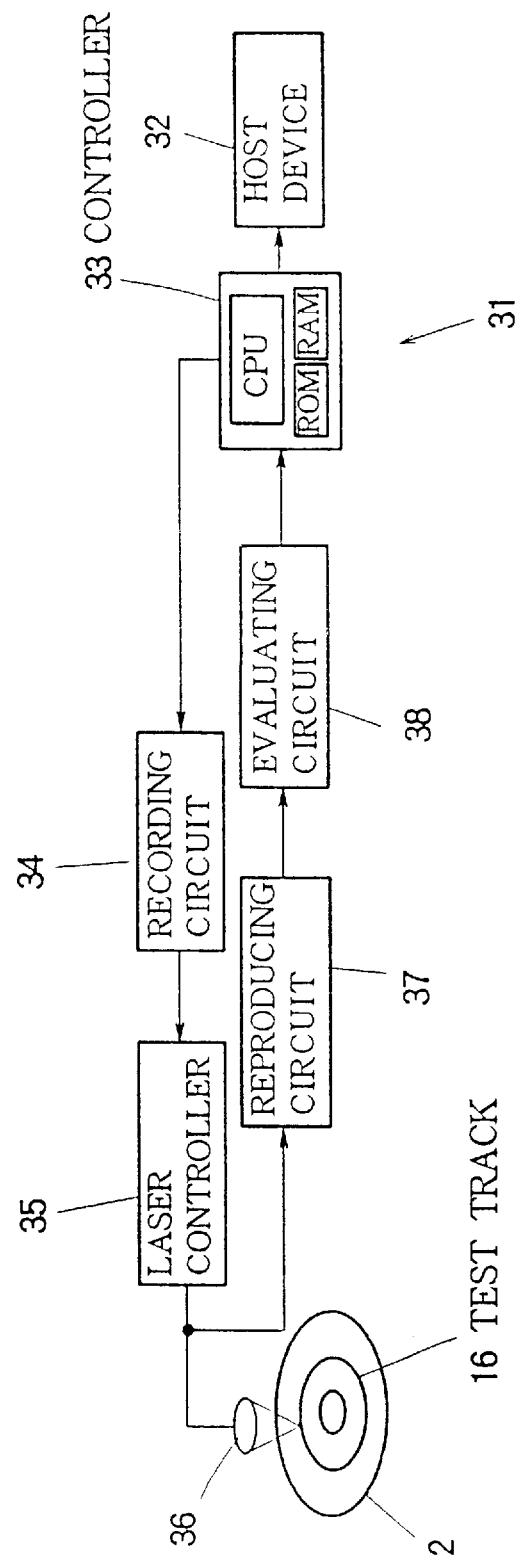
FIG. 17 is a functional block diagram showing the optical disk drive device having a function of power adjustment.

Another embodiment, Embodiment 8, will next be described with reference to FIGS. 17 and 18. This embodiment relates to an optical disk drive device, and in particular to its operation for adjusting the power of the laser beam used for writing. Such adjustment is conducted prior to the actual writing, e.g., when the drive device is turned on. FIG. 17 is a block diagram showing the function of the drive device. As illustrated, the drive device 31, which may be connected to a host device as shown in FIG. 15, comprises a controller 33 provided with a CPU, a ROM and a RAM, a recording circuit 34, a laser controller 35, a read/write head 36 with a built-in semiconductor laser, a reproducing circuit 37, and an evaluation circuit 38. The controller 33 is responsive to commands from the host device 32 for sending control signals to various parts of the device 31 to conduct the writing power adjustment. It outputs a designation of the initial value of the writing power. The recording circuit 34 conducts recording of test data responsive to the control signals from the controller 33. That is, it provides the test data used for the recording for the purpose of power adjustment. The laser controller 35 modulates the test data supplied from the recording circuit 34 and supplies the modulated test data to the read/write head 36. It sets the laser power to the initial value designated by the controller 33. The read/write head 36 records the test data on the disk 2 with the power that is set by the laser controller 35. The read/write head 36 also reads the test data having been recorded. The reproducing circuit 37 demodulates the test data read by the read/write head 36. The evaluation circuit 38 evaluates the fidelity of the reproducing data with respect to the test data output from the recording circuit 34. That is, it determines the error rate in the reproducing data, and evaluates the quality of reproduced data. On the basis of the evaluation, the controller 33 varies the set value of the writing power. The above described steps are repeated to obtain the optimum writing power.

Figure 18:
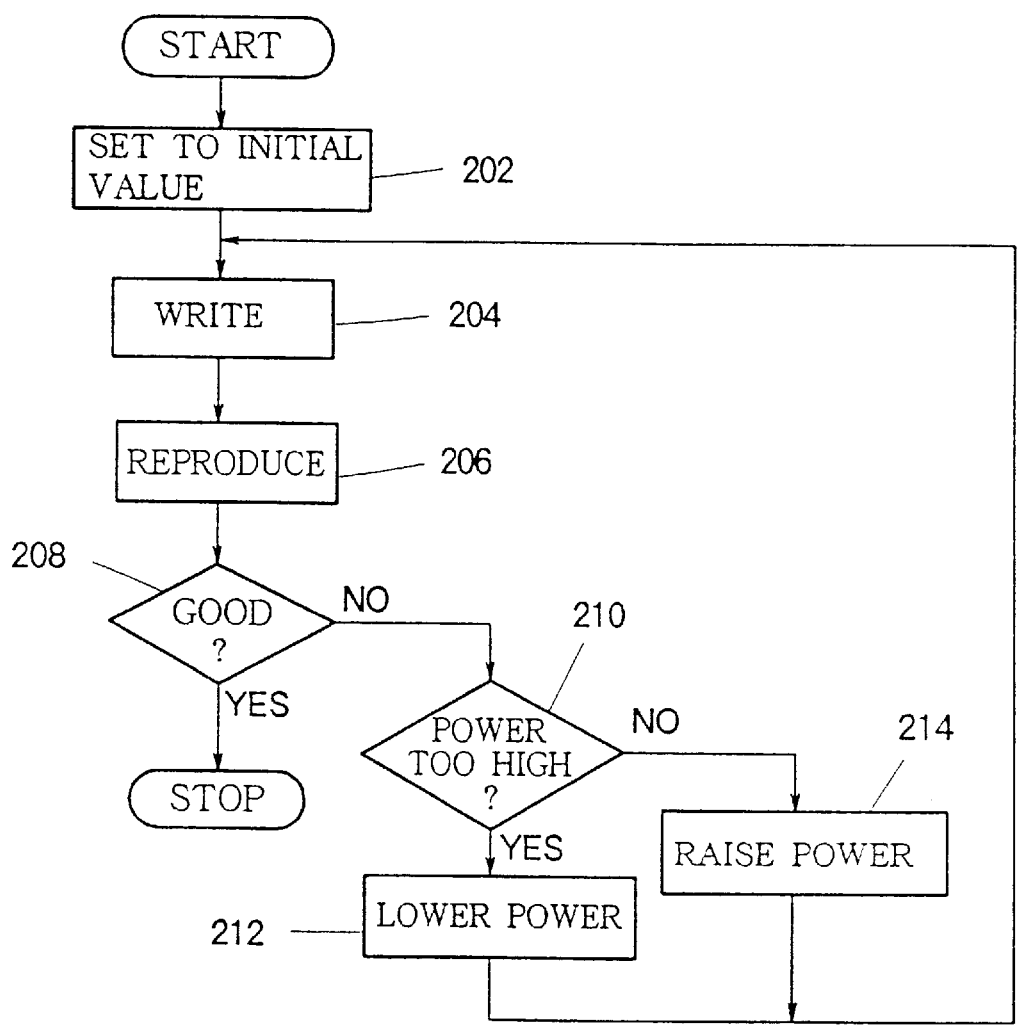
FIG. 18 is a flow chart showing the procedure for the power adjustment.

FIG. 18 shows the above-described procedure for determining the optimum writing power. First an initial value of the writing power is set (202), and the writing is conducted with he initial value (204). Then, the test data having ben written is reproduced (206). Then, the quality of the reproduced data is evaluated (208). If the quality is found satisfactory, the process is terminated. If not, judgement is made whether the power is too large or too small (210). If the power is found too large, the set value of the power is lowered (212). If the power is found too small, the set value is raised (214). Then, the process is returned to the step 204. The above-described steps are repeated until the quality of the reproduced data is found satisfactory.

Embodiment 9

Another embodiment, Embodiment 9, will next be described with reference to FIG. 19. The structure of the disk of this embodiment is generally identical to that of Embodiment 1. However, as will be detailed below, the attributes of the zones can be set independently of each other. The term "attribute" as used herein refer to an indication or designation the type of the recording area, i.e., it indicates whether the area in question is of a read/write type, a write-once type or a read-only type.

FIG. 19 shows the logical track structure of the disk of this embodiment. Each sector consists of 1024 bytes and each logical track consists of 17 sectors. The marks which are at the top parts of the respective columns and which are identical to those in FIGS. 5, 7, 8 and 12 have the same meanings as those in FIGS. 5, 7, 8 and 12. "FLT" denotes the address of the first logical track in the zone. "LT" denotes the numbers of the logical tracks for recording data, spare tracks or parity tracks in the zone. "TEST" denotes the numbers of the test tracks in the zone. "PAR" denotes the numbers of the parity tracks in the zone. The parity tracks are used to record parity symbols when the zone is designated as the O-RAM type.

As shown in FIG. 19, the recording region is divided into 30 zones, zone Nos. 0 to 29. Each zone consists of 748 physical tracks. The number of the logical tracks in each zone can be determined by dividing the number of sectors in the zone by 17. The number of the parity tracks varies from 144 to 86 with the increase of the zone number from 0 to 29, the difference between the adjacent zones being two. To determine the number of the parity tracks for each zone, it is only necessary to decrement by two. Such determination can be made by simple calculation on integers, and no table need be referred to for this calculation.

FIG. 20 shows part of the disk structure management table of the disk of Embodiment 9, in which each sector comprises 1024 bytes. The disk structure management table is provided at the head of the defect management region (at the head of the user zone, or at the first sector in the first (No. 0) zone.

The 0-the to 21st bytes in the table are for information relating to defect management, and are not directly relevant to the invention, so that their illustration and description are omitted. The 22nd to 51st bytes are for identifying the type of each of the zones Nos. 0 to 29. The "type" as meant here is either the R/W (read/write or rewritable) type, the WO (write-once) type or the O-ROM (fully embossed or read-only) type, as described above. The value "01" in the row of each byte indicates that the corresponding zone is of the R/W type. "02" in the row of each byte indicates that the corresponding zone is of the O-ROM type, and "03" in the row of each byte indicates that the corresponding zone is of the WO type. "/" between "01", "02" and "03" signifies "or".

When the disk is of the R/W type, the 22nd to 51st bytes are all set to "01". When the disk is of the WO type, the 22nd to 52st bytes are all set to "03". When the disk is of the O-ROM type, the 22nd to 51st bytes are all set to "02". When the disk is of the P-ROM type (i.e., the disk comprises one or more zones of the R/W type and one or more zones of the O-ROM type), the bytes corresponding to the R/W type zones are set to "01", while the bytes corresponding to the O-ROM type zones are set to "02".

When the disk is of the R/W+WO type (i.e., the disk comprises one or more zones of the R/W type and one or more zones of the WO type), the bytes corresponding to the R/W type zones are set to "01", while the types corresponding to the WO type zones are set to "03".

When the disk is of the WO+O-ROM type (i.e., the disk comprises one or more zones of the WO type and one or more zones of the O-ROM types), the bytes corresponding to the WO type zones are set to "03", while the bytes corresponding to the O-ROM type zones are set to "02".

When the disk is of the R/W+WO+O-ROM type (i.e., the disk comprises one or more zones of the R/W type, one or more zones of the WO type, and one or more zones of O-ROM type), the bytes corresponding to the R/W type zones are set to "01", the bytes corresponding to the WO type zones are set to "03", and the bytes corresponding to the O-ROM type are set to "02".

Each zone can be set to any type independently of other zones.

In the past, only four types of disks, i.e., the R/W type, the WO type, the O-ROM type and the P-ROM type, were available. According to the above embodiment, three additional types, i.e., the R/W+WO type, the WO+O-ROM type, and the R/W+WO+O-ROM type are available. In all, seven types are thus available.

Moreover, in the prior art P-ROM type disk, the disk is divided into two parts by a circular boundary line, and the zone or zones outside of the boundary line is of one of the R/W type and the WO type, and the zone or zones inside of the boundary line is of the other of the R/W type or the O-ROM type. In contrast, according to this embodiment, each of the zones can be set to any type freely.

Embodiment 10

Figure 21:
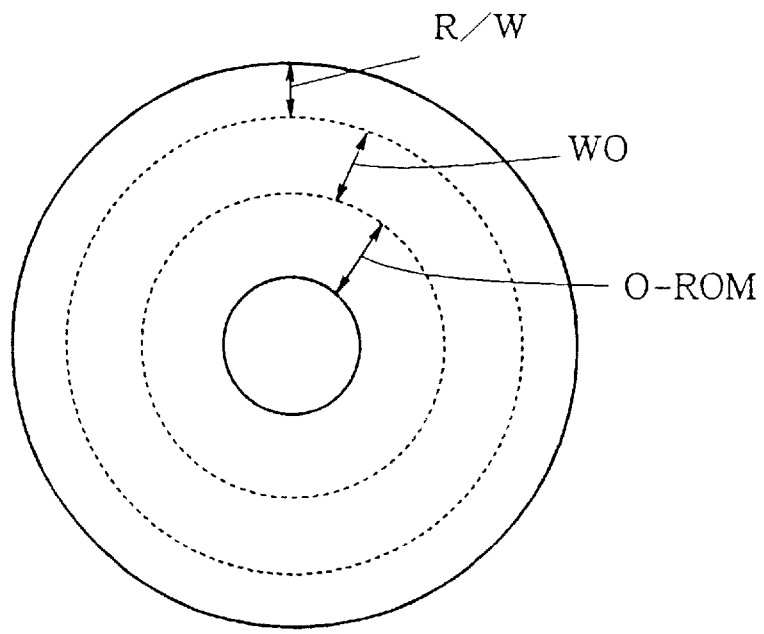
FIG. 21 is a diagram showing allocation of the parts of the disk to the respective types of recording regions according to Embodiment 9.

Another embodiment, Embodiment 10, will next be described with reference to FIG. 21. As described earlier, the disk is rotated at a constant angular velocity in use, and the frequency of the clocks used for recording and reading is switched depending on the zone in which the read/write head is accessing. Where the disk contains the R/W type zone or zones, the WO type zone or zones, and the O-ROM type zone or zones, the R/W zone or zones are placed in the outermost part of the disk, the O-ROM type zone or zones are placed in the innermost part of the disk and the WO type zone or zones are placed in the intermediate part of the disk, as illustrated in FIG. 21. The reason is that the data transfer rate is higher in the more outward zones, so that the more outward zones are assigned for the type of the recording zones which are more frequently accessed. In the above described situation, the R/W type is most frequency accessed because three types of operations, i.e., reading, writing and erasing operations are performed, so that the outermost part of the disk is allocated to the R/W type zones. The WO type zone or zones are accessed more frequently than the O-ROM type because the former additionally permits the writing operation, although only once. The W/O type zones are therefore placed more outward than the O-ROM type zones.

Embodiment 11

Figure 22:
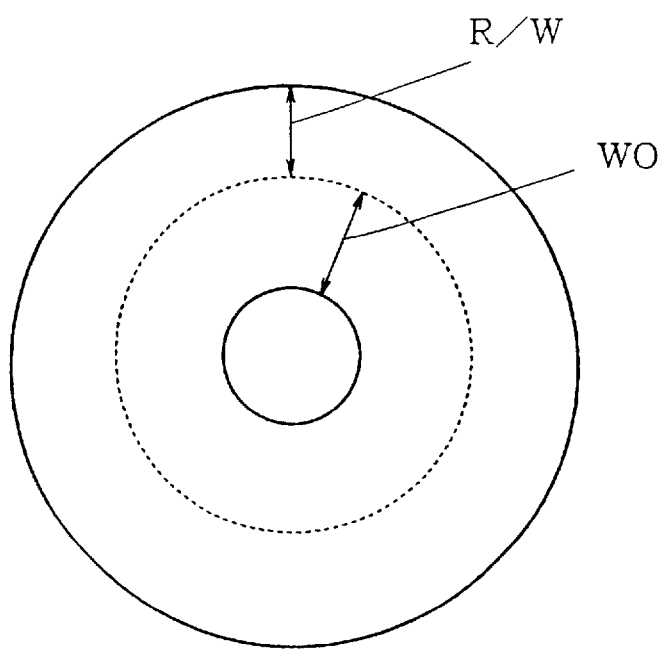
FIG. 22 is a diagram showing allocation of the parts of the disk to the respective types of recording regions according to Embodiment 10.

Another embodiment, Embodiment 11, will next be described with reference to FIG. 22. The disk is basically of the same structure as that of the Embodiment 10, but it only contains the R/W type zone or zones and the WO type zone or zones. The R/W type zone or zones are placed more outward than the W/O type zone or zones, because R/W zones are more frequently accessed.

Embodiment 12

Figure 23:
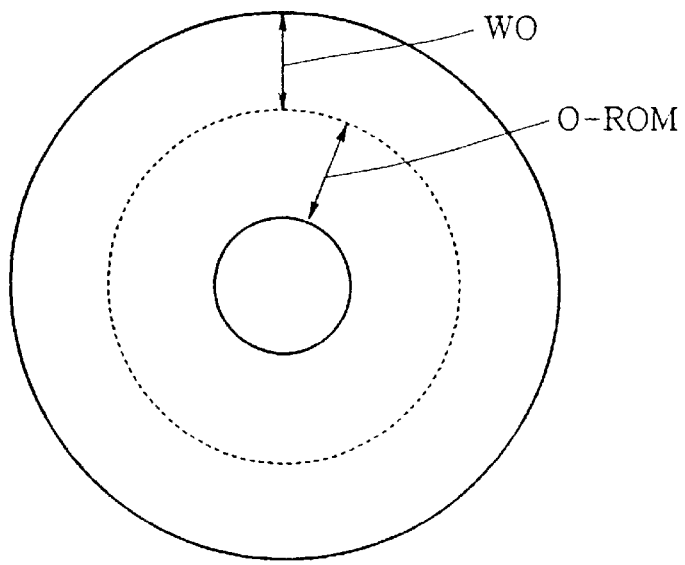
FIG. 23 is a diagram showing allocation of the parts of the disk to the respective types of recording regions according to Embodiment 11.

Another embodiment, Embodiment 12, will next be described with reference to FIG. 23. The disk is basically of the same structure as that of the Embodiment 10, but it only contains the WO type zone or zones and the O-ROM type zone or zones. The WO type zone or zones are placed more outward than the O-ROM type zone or zones, because the former permits writing operation, although only once.

Embodiment 13

Figure 24:
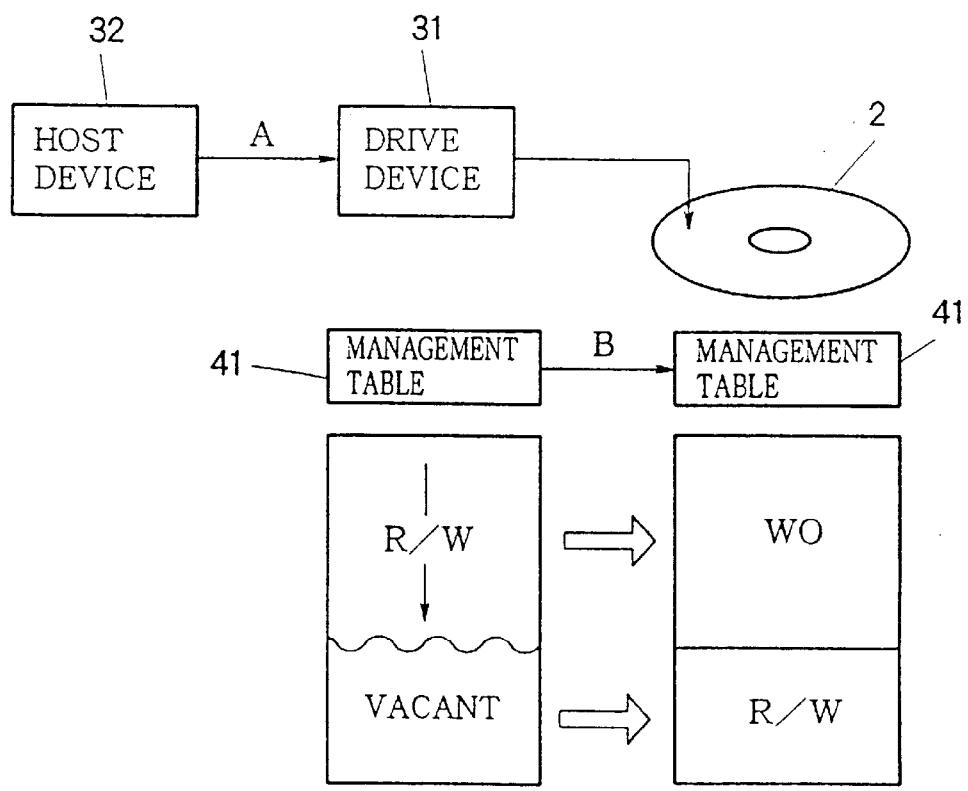
FIG. 24 is a diagram showing the optical disk drive device, and its function of altering the attributes of the zones for producing a disk equivalent to a P-ROM disk.

Another embodiment, Embodiment 13, will next be described with reference to FIG. 24. This embodiment relates to an optical disk drive device 31 which alters the attributes of the zones in the manner described below. The drive device 31 is connected to a host device 31 by an interface such as SCSI. The optical disk 2 is loaded in the drive device 31, but is shown to be placed outside the drive device 31 for convenience of illustration.

In this embodiment, the recording region is entirely of the R/W type when fabricated. However, the area denoted as "vacant" is initially inaccessible. The drive device 31 has the function of altering the attributes of the zones written in the management table. This function is performed by executing a command A. When the drive device 31 receives the command A from the host device 32, the attributes of the zones designated by the command A are altered to "WO". At the same time, the zones which have been inaccessible are altered to accessible R/W zones (as indicated by B). The zones having been altered to WO type permits writing of data once, and after that the data cannot be altered. That is this part is now like ROM type part. The R/W part, which have been altered from inaccessible part, now permits writing and reading. Thus, a disk having the same function as P-ROM is obtained.

The alteration of the attributes can be made by the user, and the attributes having been altered to WO may be returned to R/W.

An advantage of the disk of this embodiment is lower cost in some applications. P-ROM disks with their ROM part formed by embossment is expensive where the number of the disk produced at the same time is limited because of the relatively high cost of fabricating the original disk. In contrast, the disks formed in the above manner are less expensive and yet have the same function as P-ROM disks having embossed part.

Embodiment 14

Figure 25:
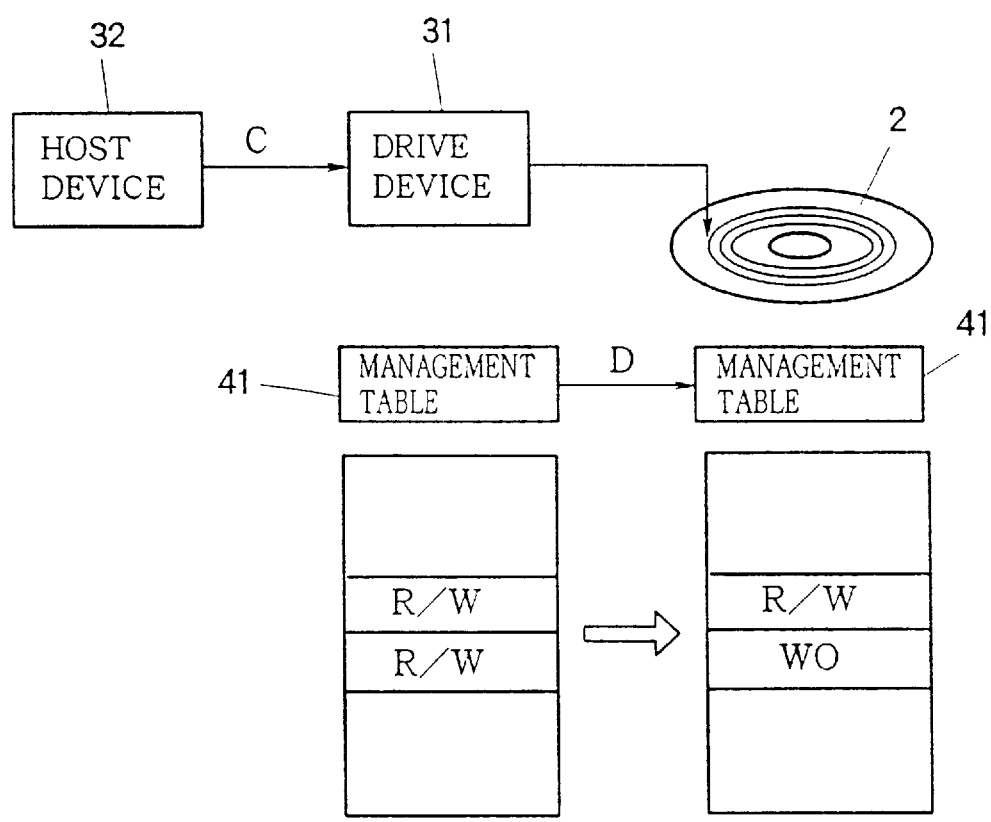
FIG. 25 is a diagram showing the optical disk drive device, and its function of altering the attributes of some only of the rewritable zones to "write-once".

Another embodiment, Embodiment 14, will next be described with reference to FIG. 25. This embodiment also relates to an optical disk drive device 31 capable of altering the attributes of the zones. In Embodiment 13, the accessible R/W zones are all changed to WO zones. In Embodiment 14, the attributes of only such zones which are designated by a command C are altered, e.g., to WO (as indicated by D). Such alteration is desired for instance to prevent alteration of data only in certain zones.

Embodiment 15

Figure 26:
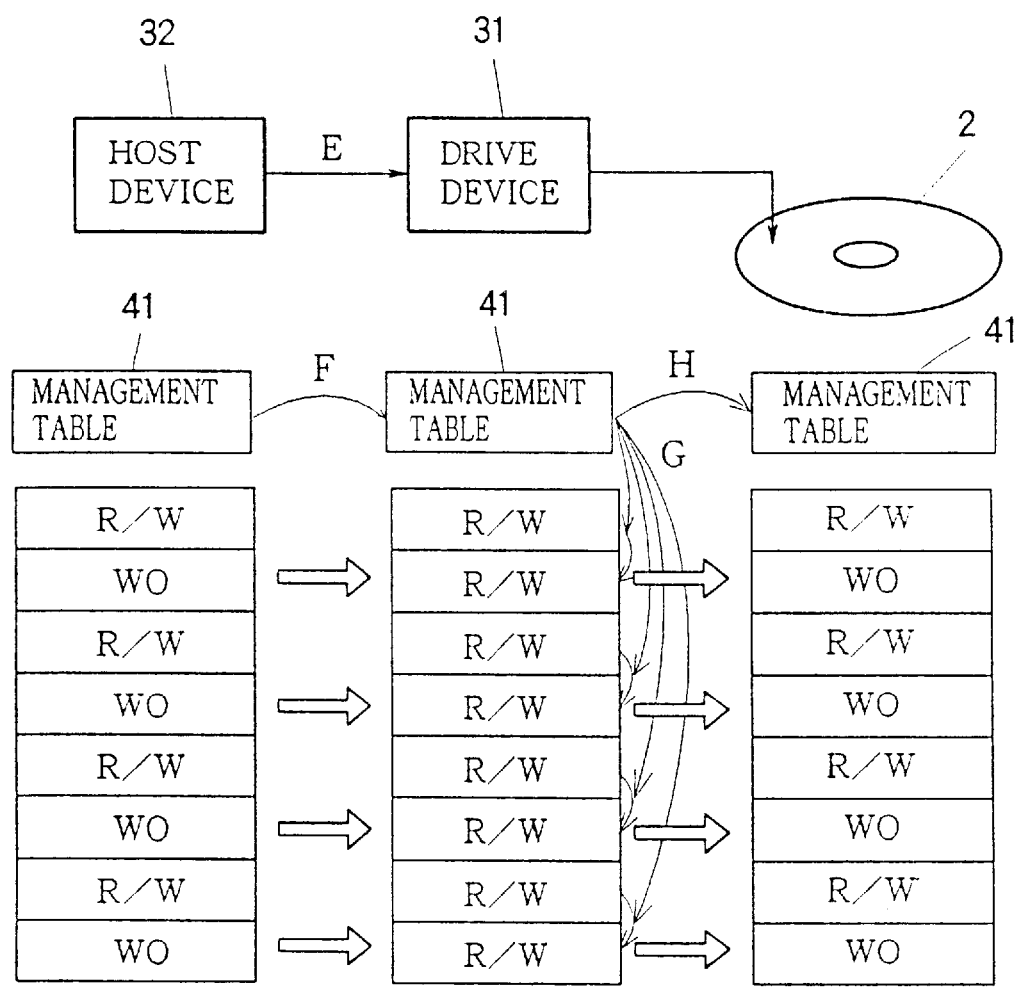
FIG. 26 is a diagram showing the optical disk drive device, and its function of altering the attributes of the zones during execution of a back-up command.

Another embodiment, Embodiment 15, will next be described with reference to FIG. 26. This embodiment also relates to an optical disk drive device capable of altering the attributes of the zones and executing a back-up command. Description of the parts identical to those in FIG. 24 is omitted. The attributes of the zones are written in the management table 41. As illustrated in FIG. 26, alternate zones are designated as R/W zones and intervening zones are designated as WO zones. The total capacity of the WO zones is about the same as the total capacity of the R/W zones.

Figure 27:
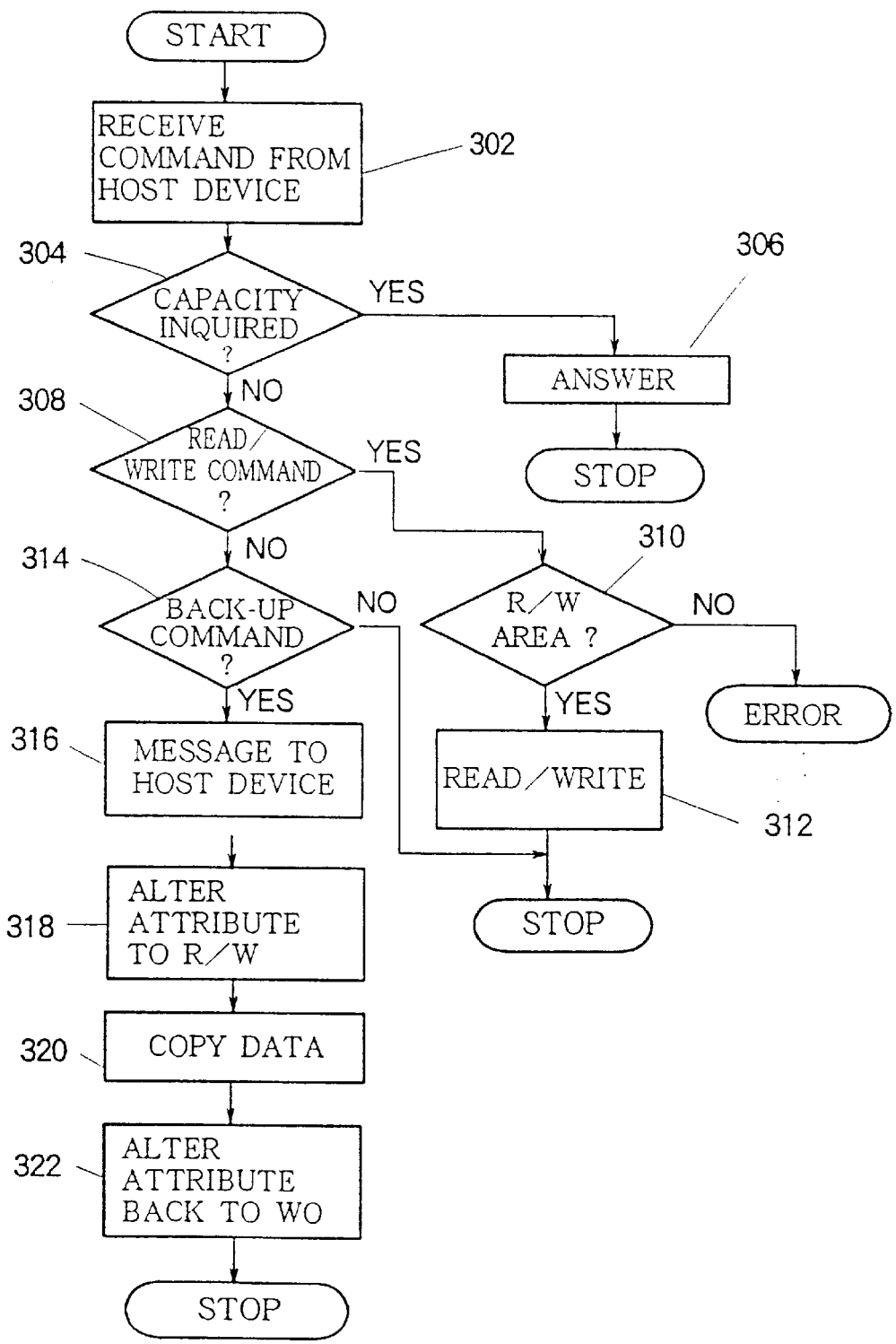
FIG. 27 is a flow chart showing the procedure of the operation of the optical disk drive device for executing the back-up command.

A procedure for control for executing a back-up command is shown in FIG. 27. First, when the drive device 31 receives the command from a host device (302), it determines whether it is an inquiry on capacity, a read/write command, or a back-up command (304). If it is the inquiry, the an answer indicating the capacity of the R/W area is sent to the host device (306). If it is the read/write command (308), judgement is then made whether the read/write head is accessing an R/W area (310), and if the answer is affirmative, the command is executed (312). If it is the back-up command (314), a message indicating that the execution of the command is completed is sent to the host device (316), and the data in the R/W area is copied into the WO area (320), when it is found that the host device is not accessing. If necessary, the attributes of the zones are altered to "R/W" (318) prior to the copying, and returned to "WO" (322) after the copying. In FIG. 26, the back-up command is indicated by E, and the alteration of the attributes in the table is indicated by F and H, and the copying of the data is indicated by G.

Embodiment 16

Another embodiment, Embodiment 16, will next be described. This embodiment also relates to an optical disk drive device capable of altering the attributes of the zones. The embodiment is similar to Embodiment 15. The optical disk 2 permits recording on both sides or surfaces. The drive device 31 has the function of reading from and writing on both surfaces of the disk without turning the disk 2 upside down. A first surface is entirely an R/W area, while a second surface is entirely a WO area. By the same procedure shown in FIG. 27, the back-up command is executed. That is, responsive to a back-up command (I), the attributes of the second surface is altered to R/W (J), the data on the first surface is copied to the second surface (K), and the attributes of the second surface is returned to (L). Because the second surface is returned to WO after the copying, the data having been copied into the second surface is not destroyed by a device which does not have the function of altering the attribute.

Embodiment 17

Figure 28:
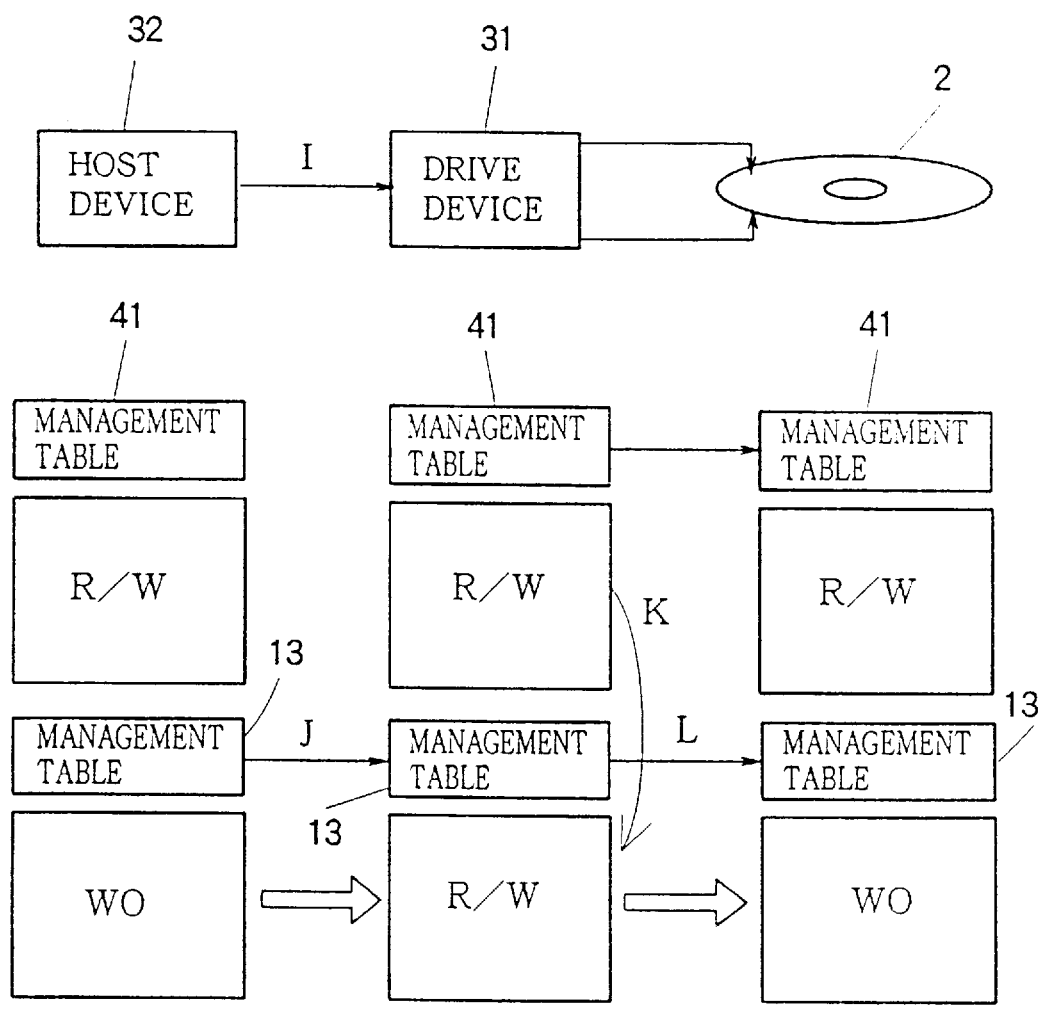
FIG. 28 is a diagram showing the optical disk drive device, and its function of altering the attributes of the zones on one surface of the disk during execution of a back-up command.
Figure 29:
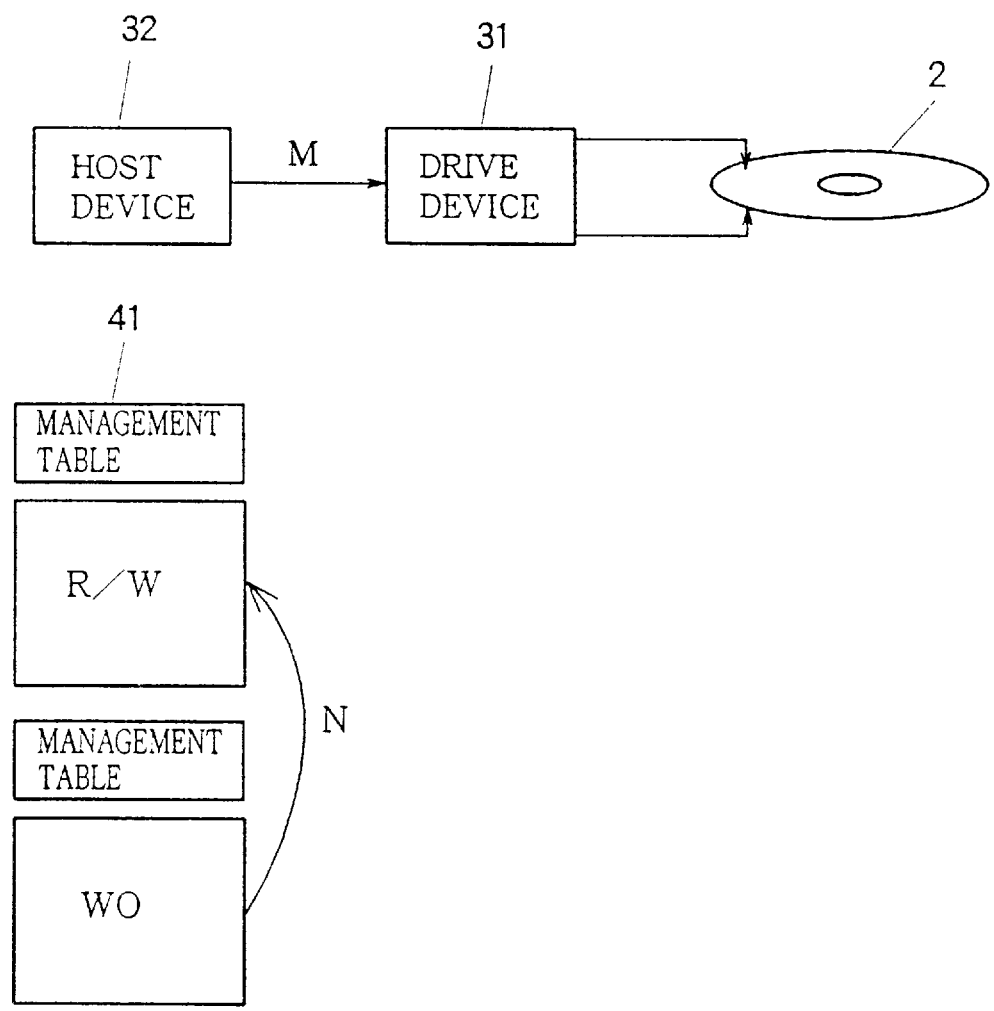
FIG. 29 is a diagram showing the optical disk drive device, and its function for restoring data from the write-once area to the rewritable area.
Figure 30:
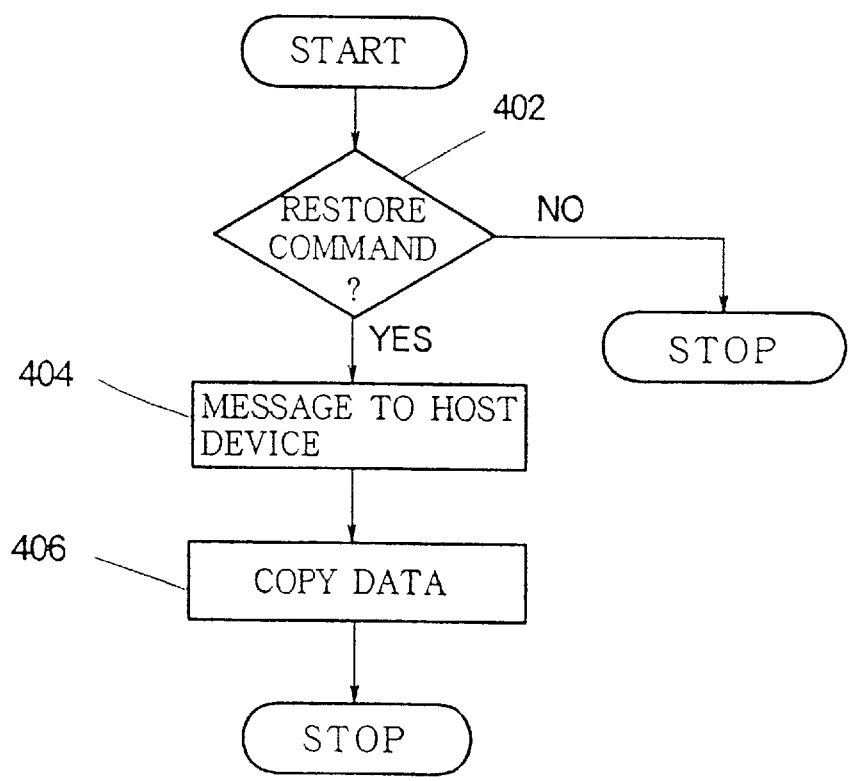
FIG. 30 is a flow chart showing the procedure of the operation of the optical disk drive device for executing the restore command.

Another embodiment, Embodiment 17, will next be described with reference to FIGS. 29 and 30. This embodiment also relates to an optical disk drive device 31 capable of altering the attributes of the zones. Description of the parts identical to those in FIGS. 26 and 28 is omitted. When the drive device 31 receives a restore command (M) from the host device 32 (402), it sends a message back to the host device 32 indicating the execution of the restore command is completed (404), and copies the data in the WO area to the R/W area (406).

The invention has been described with reference to the illustrated embodiments. However, various modifications are possible without departing from the scope of the invention.

What is claimed is:

1. An optical disk drive device for use with an optical disk; said optical disk including, a recording region;

a plurality of physical tracks formed in said recording region, each physical track corresponding to a single revolution of said optical disk;

said recording region being divided into a plurality of annular zones centered at a center of said optical disk, an annular recording density of said optical disk being higher in zones further form said center of said optical disk such that a linear recording density of said optical disk is substantially constant throughout said recording region;

an integer number of sectors formed in each of said physical tracks, each sector including a header field with a track address field;

one or more of said sectors being formed into one of a plurality of logical tracks by setting a track address in said track address field of each sector to indicate membership in one of said logical tracks, said logical tracks being divided into revolution groups such that a number of said revolution groups equals a number of said zones, thus, each revolution group corresponds to one of said zones, and boundaries between neighboring revolution groups coinciding with boundaries of corresponding zones;

the number of logical tracks and adjacent annular zones differing by a constant number;

each logical track is composed of $2^n$ sectors, with n being an integer;

said optical disk drive device determines which one of said zones contains a target sector based on a product of said constant number and the number of said zones.

2. The optical disk drive device according top claim 1, wherein said optical disk drive device includes said optical disk.

3. A method for accessing an optical disk; said optical disk including, a recording region;

a plurality of physical tracks formed in said recording region, each physical track corresponding to a single revolution of said optical disk;

said recording region being divided into a plurality of annular zones centered at a center of said optical disk, an annular recording density of said optical disk being higher in zones further from said center of said optical disk such that a linear recording density of said optical disk is substantially constant throughout said recording region;

an integer number of sectors formed in each of said physical tracks, each sector including a header field with a track address field;

one or more of said sectors being formed into one of a plurality of logical tracks by setting a track address in said track address field of each sector to indicate membership in one of said logical tracks, said logical tracks being divided into revolution groups such that a number of said revolution groups equals a number of said zones, thus, each revolution group corresponds to one of said zones, and boundaries between neighboring revolution groups coinciding with boundaries of corresponding zones;

the number of logical tracks and adjacent annular zones differing by a constant number;

each logical track is composed of $2^n$ sectors, with n being an integer;

said method comprising:
(a) multiplying said constant number and said number of zones to produce a product; and
(b) determining which one of said zones contains a target sector based on said product.

* * * * *

UNITED STATES PATENT AND TRADEMARK OFFICE
CERTIFICATE OF CORRECTION

PATENT NO. : 5,825,728
DATED : October 20, 1998
INVENTOR(S) : Kyosuke YOSHIMOTO et al It is certified that error appears in the above-identified patent and that said Letters Patent is hereby corrected as shown below:

Title page [75], change the inventorship to read

--Kyosuke Yoshimoto; Kazuhiko Nakane; Teruo Furukawa, all three of Nagaokakyo; Masafumi Ototake, Amagasaki, all of Japan--

Claim 1, line 27, change "logical tracks and adjacent" to
--logical tracks in adjacent--

Claim 3, line 27, change "logical tracks and adjacent" to
--logical tracks in adjacent--

Signed and Sealed this

Twenty-seventh Day of April, 1999

Attest:

Q. TODD DICKINSON

*Attesting Officer*  *Acting Commissioner of Patents and Trademarks*